(12) United States Patent
Cooney

(10) Patent No.: US 12,443,139 B2
(45) Date of Patent: *Oct. 14, 2025

(54) METHOD FOR A HOLOGRAPHIC PROJECTOR

(71) Applicant: Dualitas Ltd, Milton Keynes (GB)

(72) Inventor: Rory Cooney, Milton Keynes (GB)

(73) Assignee: Dualitas Ltd, Milton Keynes (GB)

( * ) Notice: Subject to any disclaimer, the term of this patent is extended or adjusted under 35 U.S.C. 154(b) by 31 days.

This patent is subject to a terminal disclaimer.

(21) Appl. No.: 18/506,355

(22) Filed: Nov. 10, 2023

(65) Prior Publication Data

US 2024/0152093 A1 May 9, 2024

Related U.S. Application Data

(63) Continuation of application No. 16/752,002, filed on Jan. 24, 2020, now Pat. No. 11,815,855.

(30) Foreign Application Priority Data

Jan. 25, 2019 (GB) ..................................... 1901025

(51) Int. Cl.
*G03H 1/04* (2006.01)
*G03H 1/00* (2006.01)
*G03H 1/24* (2006.01)

(52) U.S. Cl.
CPC ......... *G03H 1/0406* (2013.01); *G03H 1/0005* (2013.01); *G03H 1/24* (2013.01)

(58) Field of Classification Search
None
See application file for complete search history.

(56) References Cited

U.S. PATENT DOCUMENTS

| | | |
|---|---|---|
| 2002/0075776 A1 | 6/2002 | Kasazumi et al. |
| 2006/0232841 A1 | 10/2006 | Toshi et al. |
| 2013/0265622 A1 | 10/2013 | Christmas et al. |
| 2014/0022526 A1 | 1/2014 | Van Eijk et al. |
| 2014/0253987 A1 | 9/2014 | Christmas |
| 2017/0082855 A1 | 3/2017 | Christmas et al. |
| 2017/0115627 A1 | 4/2017 | Christmas et al. |

(Continued)

FOREIGN PATENT DOCUMENTS

| | | |
|---|---|---|
| GB | 2496108 A | 5/2013 |
| GB | 2526275 A | 11/2015 |

(Continued)

OTHER PUBLICATIONS

Search Report under Section 17, United Kingdom Patent Application GB1901025.5, dated Jul. 31, 2019.
Copending U.S. Appl. No. 16/752,002, filed Jan. 24, 2020.

*Primary Examiner* — Jyotsna V Dabbi

(57) ABSTRACT

A projection system that facilitates the use of in-situ detection of a change in wavelength, thereby enabling appropriate compensation or corrections to be applied on the fly to improve the quality of the image in the primary image region. In-situ detection in this manner can allow wavelength changes due to both temperature fluctuations and hardware variations to be compensated for simultaneously, thereby reducing the time and expense for end of line hardware testing, and removing the need to perform in-situ mapping of the wavelength as a function of temperature. In this way, the quality of the image provided to a user can be improved in a simpler, more efficient manner.

25 Claims, 11 Drawing Sheets

(56) References Cited

U.S. PATENT DOCUMENTS

| | | |
|---|---|---|
| 2017/0363869 A1 | 12/2017 | Christmas et al. |
| 2018/0046138 A1 | 2/2018 | Christmas et al. |
| 2018/0120768 A1 | 5/2018 | Christmas |
| 2018/0188532 A1 | 7/2018 | Christmas et al. |
| 2019/0041641 A1 | 2/2019 | Christmas et al. |
| 2019/0064738 A1 | 2/2019 | Cole et al. |

FOREIGN PATENT DOCUMENTS

| | | |
|---|---|---|
| GB | 2554575 A | 4/2018 |
| GB | 2559112 A | 8/2018 |
| GB | 2567409 A | 4/2019 |
| GB | 2567410 A | 4/2019 |
| GB | 2569206 A | 6/2019 |
| GB | 2569208 A | 6/2019 |
| JP | H09068917 A | 3/1997 |
| JP | 2005-069784 A | 3/2005 |
| WO | 2018078366 A1 | 5/2018 |
| WO | 2018100394 A1 | 6/2018 |
| WO | 2018100395 A1 | 6/2018 |
| WO | 2018100397 A1 | 6/2018 |

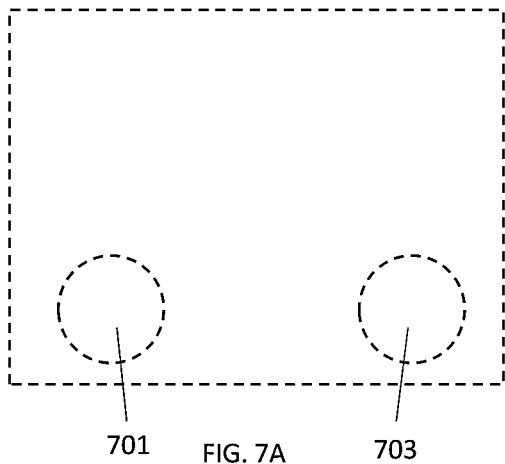
701  FIG. 7A  703
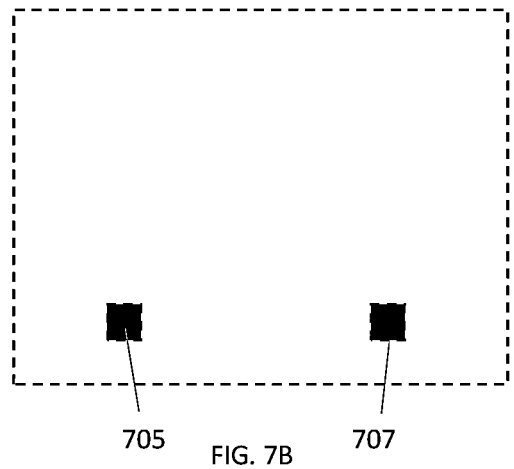
705  FIG. 7B  707
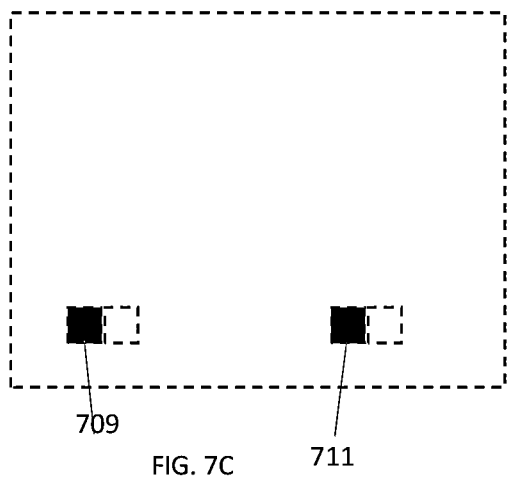
709  FIG. 7C  711
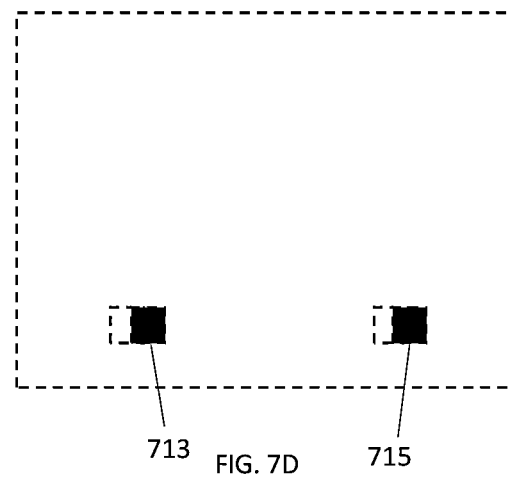
713  FIG. 7D  715
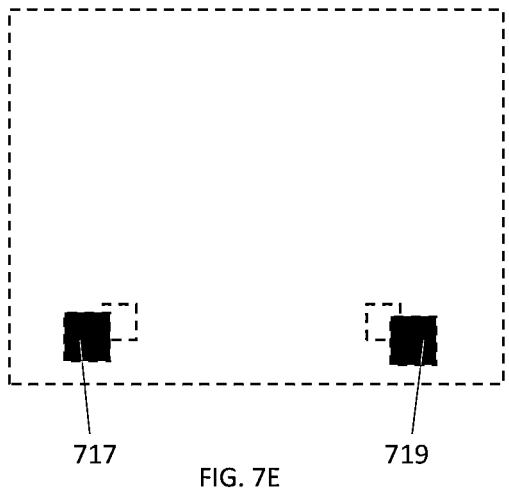
717  FIG. 7E  719
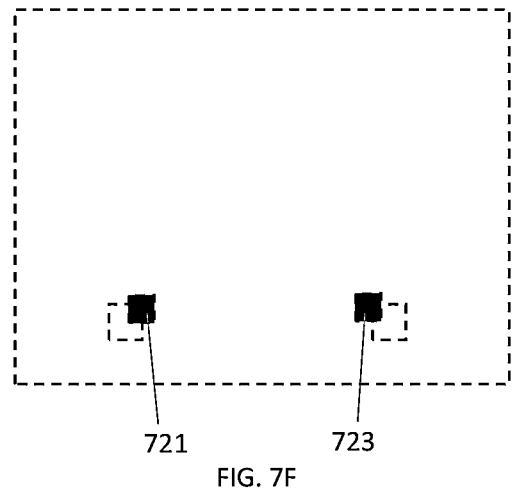
721  FIG. 7F  723

METHOD FOR A HOLOGRAPHIC PROJECTOR

CROSS-REFERENCE TO RELATED APPLICATIONS

This application is a continuation of U.S. application Ser. No. 16/752,002, filed Jan. 4, 2020, which claims the benefit of United Kingdom Patent Application No. 1901025.5, filed Jan. 25, 2019, each of which is hereby incorporated herein by reference in its entirety.

FIELD

The present disclosure relates to a system for wavelength measurement. More specifically, the present disclosure relates to a projection system for measuring a wavelength of light. Some aspects relate to a holographic projector or holographic projection system for measuring a wavelength of light. Some aspects relate to a head-up display and a head-mounted display. Some aspects relate to a method of measuring a wavelength of light.

TECHNICAL BACKGROUND

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel transform or Fourier transform. These types of holograms may be referred to as Fresnel or Fourier holograms. A Fourier hologram may be considered as a Fourier domain representation of the object or a frequency domain representation of the object. A CGH may also be calculated by coherent ray tracing or a point cloud technique, for example.

A CGH may be displayed, represented, or otherwise encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. not comprised of pixels) and light modulation may therefore be continuous across the device. The SLM may be reflective, meaning that modulated light is output from the SLM in reflection. The SLM may equally be transmissive, meaning that modulated light is output from the SLM is transmission.

A holographic projector for imaging may be provided using the described technology. Such projectors have found application in head-up displays, "HUD", and head-mounted displays, "HMD", including near-eye devices, for example.

The quality of a holographic reconstruction, or image, produced by a holographic projector is affected by the wavelength of light used to form the holographic reconstruction (i.e. the wavelength of the laser). For example, changes of even a couple of nanometres in the wavelength of light from the light source can cause misalignment of the pixels in the image and can affect the colour balance of the overall image. Such a variation in colour balance and image quality is clearly disadvantageous, but is particularly detrimental in industries such as the automotive industry, which imposes strict requirements on the resolution and colour specification of an image.

Variations in the wavelength of the light can be caused by variations between different pieces of hardware or, when a laser light source is used, by temperature changes in the laser during use. Variations in hardware, for example caused by manufacturing tolerances, etc, are typically measured as part of end of line testing, but this approach can add significantly to the time and cost of the manufacturing and testing process. Moreover, the wavelength changes are often so small that it can be a significant challenge to detect the wavelength change within measurement tolerances. The approach to managing wavelength error in lasers caused by changing temperature within the laser cavity has typically been to map laser wavelength as a function of temperature in-situ and then compensate the laser accordingly. However, it is difficult to accurately measure and map the temperature of a laser in-situ in this way.

It is desirable to improve the characterisation or measurement of a wavelength of light in order that degradation in the quality and colour balance of images formed with the light can be appropriately corrected or compensated for. This is particularly desirable in the field of holographics, or holography.

SUMMARY OF THE DISCLOSURE

Aspects of the present disclosure are defined in the appended independent claims, with optional features defined in the appended dependent claims.

There is provided a projection system arranged to detect a change in a wavelength of light from a light source. The projection system comprises: a light source arranged to output light having a wavelength; and a spatial light modulator arranged to receive the light from the light source and output spatially modulated light in accordance with a diffractive pattern comprising a computer-generated hologram to form an image. The image comprises a primary image region comprising information for a user and first and second control image regions. The image is a holographic reconstruction of the computer-generated hologram. The projection system further comprises: a detector arrangement configured to detect light travelling to or from the first control image region and output a first signal representative of a position of the first control image region and to detect light travelling to or from the second control image region and output a second signal representative of a position of the second control image region; and a processor. The processor is arranged to: cause the spatial light modulator to display the diffractive pattern comprising the computer-generated hologram to form the image, wherein the positions of the first and second control image regions are dependent on the computer-generated hologram and the wavelength; receive the first and second signals; determine the relative position of the first and second control image regions based on the first and second signals; and detect a change in the wavelength based on a change in the relative position of the first and second control image regions.

The projection system can be integrated within another device, for example the system can be integrated with a head-up display for use in a vehicle. Optionally, the projection system is a holographic projection system, but the above principles can be equally applied with images formed by means other than holographic reconstruction.

The projection system can facilitate the use of in-situ detection of a change in wavelength, thereby enabling appropriate compensation or corrections to be applied on the fly to improve the quality of the image in the primary image region. In-situ detection in this manner can allow wavelength changes due to both temperature fluctuations and hardware variations to be compensated for simultaneously, thereby reducing the time and expense for end of line hardware testing, and removing the need to perform in-situ mapping of the wavelength as a function of temperature. In this way, the quality of the image provided to a user can be improved in a simpler, more efficient manner.

Moreover, the detection of a change in the relative position of first and second control image regions to detect a change in the wavelength acts as a confirmation that any detected change is a result of a change in the wavelength change, rather than a shift in position due to an optical misalignment or mechanical translation (i.e. due to an impact of a vibration in the system). Any actual change in the wavelength can thus be appropriately compensated for, without the risk of distorting the image based on a perceived, but erroneous, detection of wavelength fluctuation.

It can be sufficient to simply detect that a change in a wavelength of light has occurred for said change to be corrected for but, in some implementations, it may be necessary to quantify the wavelength change in order to apply an appropriate adjustment or compensation. The processor is therefore optionally further arranged to calculate the wavelength of light. Advantageously, this calculation can be performed in-situ with the projection system in any suitable manner. For example, the processor may be configured to calculate a fractional change in the wavelength of the output light from a fractional change in the relative position of the first and second control image regions. Since the size of the replay field is proportional to the wavelength, a change in the wavelength causes an expansion or contraction of the replay field, and thus of the image displayed within the replay field. There is a consequently a change in the radial distance of both the first and second control image regions from a centre of the SLM. In other words, the fractional change in the relative position is due to the changes in the radial distances of the control image regions. The processor can be configured to use the fractional change to find the absolute value of current wavelength.

Alternatively, the processor may be configured to calculate a fractional change in the wavelength of the output light from a fractional change in the position of just one of the two control image regions. Again, since the size of the replay field is proportional to the wavelength, a wavelength change can be derived directly from a measurement of the change in position of just one of the control image regions using simple geometry. In this arrangement, the fractional change in a radial distance of one of the control image regions from a centre of the spatial light modulator is determined, and is proportional to the fractional change in the wavelength of the output light. The processor can be configured to use the fractional change to find the absolute value of current wavelength.

In some embodiments, only a computer-generated hologram is displayed on the spatial light modulator when the diffractive pattern is displayed. The hologram is a diffractive pattern—that is, a pattern that causes diffraction of light when displayed on the spatial light modulator. The positions of the first and second control image regions and the information in the primary image region can be changed by changing the computer-generated hologram. Optionally, the diffractive pattern displayed on the spatial light modulator can comprise both the computer-generated hologram and a second diffractive pattern. For example, the computer-generated hologram can be combined with a second diffractive pattern arranged to perform a grating function—that is, a beam steering function which determines the position of the primary replay field, and therefore the first and second control image regions, on the replay plane. The second diffractive pattern arranged to perform a grating function may be referred to as a grating function component because it is a component of the diffractive pattern displayed on the spatial light modulator. Optionally, only the grating function component may be changed to change the positions of the first and second control image regions; this can change the position of the first and second control image regions without changing the image content displayed in the primary image region.

In some embodiments, the processor may be configured to calculate the wavelength of the light directly, i.e. not based on the relative position of the first and second control image regions. In this arrangement, the processor may be configured to: change the grating function to adjust the positions of the first and second control image regions; determine, based on the received first signal, if the position of the first control image region at least partially overlaps with a first detector region of the detector arrangement; optionally determine, based on the received second signal, if the position of the second control image region at least partially overlaps with a second detector region of the detector arrangement; determine the grating function which gives rise to both the least partial overlap of the first control image region and the first detector region and optionally the at least partial overlap of the second control image region and the second detector region; calculate an angle of diffraction corresponding to said determined grating function based on the positions of the first (and optionally the second) detector region(s); and calculate the wavelength of the output light based on a diffraction spacing of the grating function and the determined angle of diffraction. The calculation above can be performed on the basis of the first control image region only—the position or movement of the second control image region is not considered, and no second detector region is needed. Optionally, as indicated above, the position of the second control image region is also considered.

Optionally, the processor may be arranged to determine that the position of the first control image region at least partially overlaps with the first detector region of the detector arrangement if an intensity of light detected by the first detector region is above a predetermined intensity threshold set based on an expected intensity of the first control image region. Optionally, the processor may be arranged to determine that the position of the second control image region at least partially overlaps with the second detector region of the detector arrangement if an intensity of light detected by the second detector region is above a predetermined intensity threshold set based on an expected intensity of the second control image region. For example, the first and second control image regions may have an expected intensity; when the intensity of light detected by the first and/or second detector regions is above the predetermined intensity threshold, this indicates that the first and/or second control image regions is aligned with the relevant detector regions. The angle of diffraction can thus be determined from the positions of the first and second detector regions. The first and second control image regions are optionally located at equal but opposite angles of diffraction relative to an optical axis of the output light.

Alternatively, the processor may be configured to calculate the wavelength of the light directly using the diffractive effect of the pixels of the spatial light modulator. In particular, the processor may be configured to turn off the spatial light modulator so that no computer-generated hologram is displayed. In this arrangement, the regular array of the pixels of the spatial light modulator act as a diffraction grating, or 'pixel grating', causing diffraction of the light received from the light source. In other words, the structure of the spatial light modulator itself (the pixel grating formed from the regular array of pixels of the spatial light modulator) acts as a physical diffraction grating.

The spatial light modulator outputs light diffracted in accordance with the regular array of pixels of the spatial light modulator to form an image comprising first and second image regions, wherein positions of the first and second image regions are based on the pixel spacing and the wavelength. The first image region may be a spot of light within an overall image corresponding to the diffraction pattern due to the pixel grating. In particular, the first image region may correspond to first order diffracted light diffracted by the pixel grating; and the second image region may also correspond to first order light diffracted by the pixel grating. That is, the first and second image regions can be considered to correspond to the −1 and +1 orders of diffracted light formed by the pixel grating and located at equal but opposite angles of diffraction relative to an optical axis of the output light. The detector arrangement is arranged to detect light travelling to or from the first image region and output a first signal representative of a position of the first image region. Optionally, the detector arrangement is also arranged to detect light travelling to or from the second image region and output a second signal representative of a position of the second image region.

The processor is arranged to: receive the first signal; determine the position of the first image region based on the first signal; calculate an angle of diffraction based on the position of the first image region; and calculate the wavelength of the output light based on a spacing of pixels of the spatial light modulator and the calculated angle of diffraction. Optionally, the processor is also arranged to: receive the second signal; determine the position of the second image region based on the second signal; calculate an angle of diffraction based on the positions of the second image region as well as the first image region and calculate the wavelength based on the calculated angle of diffraction.

Optionally, the processor is further arranged to adjust the light source to compensate for the detected wavelength change. Optionally, the processor is further arranged to adjust the computer-generated hologram to compensate for the detected wavelength change. By compensating or adjusting the light source and/or the computer-generated hologram in accordance with the detected wavelength change (or, optionally, in accordance with the calculated wavelength when the wavelength is calculated), the quality (for example the resolution and colour balance) of the holographic reconstruction, or image, to be displayed to a user can be continuously maintained, despite variations in the wavelength of the light source during use.

Optionally, the detector arrangement comprises a first detector region and a second detector region. The first and second detector regions can correspond to separate and distinct detectors; a first detector can comprise the first detector region, and a second detector can comprise the second detector region. Alternatively, the detector arrangement may be a single detector comprising the first and second detector regions. The detector arrangement may comprise a camera arrangement or an arrangement of photodiodes, for example, although any suitable form of detector arrangement may be used.

Optionally, positions of the detector arrangement and the spatial light modulator are fixed relative to one another, although the detector arrangement may be configured to move in space over time, provided the position of the detector at any given time is known. This can facilitate a simplified calculation of the wavelength.

There is provided a method of detecting a change in a wavelength of light from a light source. The method comprises: receiving light having a wavelength from a light source at a spatial light modulator; displaying a diffractive pattern comprising a computer-generated hologram on the spatial light modulator; spatially modulating the received light in accordance with the displayed computer-generated hologram to form an image, the image comprising a primary image region comprising information for a user and first and second control image regions, wherein positions of the first and second control image regions are dependent on the computer-generated hologram and the wavelength; detecting at a detector arrangement light travelling to or from the first control image region and light travelling to or from the second control image region; receiving a first signal representative of a position of the first control image region and receiving a second signal representative of a position of the second control image region based on the detected light; determining the relative position of the first and second control image regions based on the first and second signals; detecting a change in the wavelength based on a change in the relative position of the first and second control image regions.

Optionally, the method further comprises calculating a fractional change in the wavelength of the output light from a fractional change in the relative position of the first and second control image regions. Alternatively, the method may further comprise calculating a fractional change in the wavelength of the output light from a fractional change in the position of the first control image region. Alternatively, it some implementations it may be beneficial to calculate the absolute value of the wavelength, rather than the fractional change in the wavelength—the method may then further comprise calculating the wavelength.

Optionally, the diffractive pattern further comprises a grating function component, or grating function, and the method of calculating the wavelength comprises changing the grating function to adjust the position of the first control image region; determining, based on the received first signal, if the position of the first control image region at least partially overlaps with a position of a first detector region of the detector arrangement; determining the grating function which gives rise to the least partial overlap of the first image control region and the first detector region; calculating an angle of diffraction corresponding to said determined grating function based on the position of the first detector region; and calculating the wavelength of the output light based on a diffraction spacing of the grating function and the determined angle of diffraction. In this arrangement, the computer-generated hologram is unchanged, such that the image content displayed in the primary image region for a user is unchanged.

Optionally, the method further comprises: determining, based on the received second signal, if the position of the second control image region at least partially overlaps with a position of a second detector region of the detector arrangement; determining the grating function which gives rise to both the least partial overlap of the first image control region and the first detector region and the at least partial overlap of the second control image region and the second detector region; and calculating the angle of diffraction corresponding to said determined grating function based on the positions of the first and second detector regions.

Optionally, the method of calculating the wavelength comprises: subsequent to detecting the change in wavelength, displaying a diffraction grating to form an image, wherein a position of a region of the image is dependent on the diffraction grating and the wavelength detecting at the detector arrangement light travelling to or from the image; receiving a signal representative of a position of the region of the image based on the detected light; changing the diffraction grating to adjust the position of the region of the image; determining, based on the received signal, if the position of the region of the image at least partially overlaps with a position of the detector arrangement; determining a diffraction spacing of the diffraction grating which gives rise to the least partial overlap; calculating an angle of diffraction corresponding to said determined diffraction grating based on the position of the detector arrangement; and calculating the wavelength of the output light based on the diffraction spacing and the determined angle of diffraction. In this arrangement, the diffraction grating displayed on the spatial light modulator is not a hologram but a real image. The region of the image under consideration includes a feature of the image; e.g. the region of the image can comprise a diffraction spot, for example a spot of first or second order diffracted light. Alternatively, the region of the image can comprise another diffraction feature.

In this arrangement, a real diffraction grating is displayed on the spatial light modulator (i.e. the diffraction grating is not a hologram). The diffraction grating can be a blazed, or echelette, grating. A blazed grating is optimized to achieve maximum grating efficiency in a given diffraction order. The periodicity of the grating, or the spacing between the diffractive components of the grating, is varied to calculate a wavelength of the light incident on the SLM in the manner described. Alternatively, the diffraction grating can be a Ronchi grating with alternate columns of 0 and π phase delay to cause diffraction, or any other suitable form of diffraction grating. The image is the diffraction pattern formed from the displayed diffraction grating in the primary or zero-order replay field. The image thus comprises undiffracted light spot(s) and one or more diffracted light spots. Optionally, the region of the image under consideration corresponds to the region of the image in which a spot of light corresponding to first order diffracted light is located.

Optionally, the structure of the spatial light modulator itself (the pixel grating) may be used to calculate the wavelength and the method of calculating the wavelength comprises: turning off the spatial light modulator after a wavelength change is detected; and diffracting the received light in accordance with a spacing of pixels of the spatial light modulator to form at least a first image region, wherein a position of the first image region is dependent on the spacing of the pixels and the wavelength. The first image region may be a spot of light within an overall image corresponding to the diffraction pattern due to the pixel grating. In particular, the first image region may correspond to first order diffracted light diffracted by the pixel grating; optionally first and second image regions of the image may be considered, corresponding to the −1 and +1 orders of diffracted light formed by the pixel grating and located at equal but opposite angles of diffraction relative to an optical axis of the output light.

The method further comprises: detecting at a detector arrangement light travelling to or from the image; receiving a signal representative of a position of the first image region based on the detected light; determining the position of the first image region based on the signal; calculating an angle of diffraction based on the position of the first image region; and calculating the wavelength of the output light based on the spacing of pixels of the spatial light modulator and the calculated angle of diffraction. When first and second regions are considered, the positions of one or both of the image regions can be used to calculate the angle of diffraction.

Once the wavelength has been calculated (whether in accordance with one of the above described methods for doing so, or by any other suitable method) the method may optionally further comprise compensating for the calculated wavelength by adjusting the light source. Optionally, the method may further comprise compensating for the calculated wavelength by adjusting the computer-generated hologram.

Also disclosed is a projection system arranged to calculate a wavelength of light from a light source. The projection system can be a holographic projection system. The projection system comprises: a light source arranged to output light having a wavelength; a spatial light modulator arranged to receive the light from the light source and output spatially modulated light in accordance with a diffraction grating displayed on the spatial light modulator to form an image; a detector arranged to detect light of a region of the image and arranged to output a signal representative of a position of the region of the image based on the detected light; and a processor. The processor is arranged to: cause the spatial light modulator to display the diffraction grating to form the image, wherein the position of the region of the image is dependent on the diffraction grating and the wavelength; receive the signal representative of the position of the region of the image; and calculate the wavelength of the output light based on the received signal. The region of the image comprises a diffraction feature, such as spot of diffracted light (diffraction spot).

In this arrangement, the detector is arranged to detect light or not—in other words, the detector output is binary. When the detector detects light of the region of the image under consideration a signal is output; this indicates that a position of the region of the image (i.e. the position of the diffraction spot or other feature of the image) overlaps with a position of the detector. When the position of the region of the image does not overlap with the position of the detector, the detector does not output a signal. In this arrangement, the wavelength can be calculated simply by adjusting the diffraction grating until the detector 'fires' or outputs a signal indicating light is detected.

Alternatively, the detector is arranged to detect an intensity of light of the region of the image and arranged to output a signal representative of the detected intensity. The processor is arranged to receive the signal representative of the detected intensity and calculate the wavelength of the light based on the received signal. The intensity of light of the region of the image is the intensity of light travelling to or from the region of the image. The region of the image under consideration may correspond to a first order diffraction spot produced by the diffraction grating, for example, or a second or higher order diffraction. The detected intensity can be used to calculate the relative position of the image and the detector. The image itself comprises the diffraction pattern due to the displayed diffraction grating.

The processor configured to calculate the wavelength is configured to: change the diffraction grating displayed on the spatial light modulator to adjust the position of the region of the image; determine if the position of the region of the image at least partially overlaps with a position of the detector based on the received signal; determine the diffraction grating which gives rise to the determined at least partial overlap; calculate an angle of diffraction corresponding to said diffraction grating based on the position of the detector; and calculate the wavelength of the output light from a diffraction spacing of the determined diffraction grating and the calculated angle of diffraction. Here, changing the diffraction grating comprises changing a diffraction spacing of the diffraction grating.

In this arrangement, a diffraction grating is displayed on the spatial light modulator. The diffraction grating can be a blazed, or echelette, grating, or any other suitable form of diffraction grating, as discussed above.

The positions of the detector and the spatial light modulator are fixed relative to one another, although the detector may be configured to move in space over time, provided the position of the detector at any given time is known. This can facilitate a simplified calculation of the wavelength. Optionally, the detector is arranged to output a signal if the detected intensity of the region of the image is above a predetermined intensity threshold set based on an expected intensity of the region of the image. For example, the predetermined intensity can be set based on an expected intensity of the region of the image when the region of the image corresponds to a spot of first order diffracted light. When the intensity increases above the threshold, this signals that the position of the region of the image overlaps at least partially with the detector and therefore that the first order diffracted light spot is aligned with the detector, for example.

The projection system described herein can be employed to verify the wavelength of the light incident on the SLM. For example, the detector can be arranged to output a signal representative of a detected intensity of light of the region of the image, and the processor can be further configured to compare the received signal representative of the intensity of the light of the region of the image (i.e. representative of the intensity of the light travelling to or from the region) to an expected intensity. For example, for a given diffraction grating and wavelength of the light source the intensity of the region of the image (i.e. the intensity of the first diffraction order spot, or a spot of light of higher diffraction order than the first diffraction order) can be pre-calculated or pre-measured. The processor can then be configured to compare this predetermined or predefined (the 'expected') intensity to the intensity determined by the detector. In this way, it can be verified that the wavelength of the light source incident on the SLM is the desired or intended wavelength, or ascertained as to whether the wavelength has fluctuated or deviated from the intended wavelength. The processor can be further configured to adjust the light source in dependence on the verification process to compensate the wavelength.

Also disclosed is a method of calculating a wavelength of light from a light source, the method comprising: receiving light having a wavelength from a light source at a spatial light modulator; displaying a diffraction grating on the spatial light modulator; spatially modulating the received light in accordance with the diffraction grating to form an image region, wherein a position of a region of the image is dependent on the diffraction grating and the wavelength; detecting at a detector light travelling to or from the region of the image; and receiving a signal representative of a position of the region of the image based on the detected light; and calculating the wavelength based on the position of the region of the image. Calculating the wavelength can comprise: changing the diffraction grating displayed on the spatial light modulator to adjust the position of the region of the image; determining if the position of the region of the image at least partially overlaps with a position of the detector based on the received signal; determining the diffraction grating which gives rise to the determined at least partial overlap; calculating an angle of diffraction corresponding to said diffraction grating based on the position of the detector; and calculating a wavelength of the output light from a grating spacing of the determined diffraction grating and the calculated angle of diffraction.

Optionally, the method further comprises compensating for the calculated wavelength by adjusting the light source. Optionally, the method further comprises adjusting the light source to compensate the wavelength in dependence on the step of verifying.

In any of the above described arrangements, the spatial light modulator is optionally a liquid crystal on silicon spatial light modulator. Optionally, the spatial light modulator is an optically addressed SLM. Preferably, the SLM is arranged to spatially-modulate the phase and/or the amplitude of the light of the input beam. Optionally, the holographic reconstruction is formed by interference of the spatially modulated light.

In some embodiments, the hologram provided to the SLM to be displayed or represented on the SLM is a computer generated hologram. In other words, the hologram has been computed by a hologram calculation engine, rather than merely stored within a memory or displayed or represented on the SLM. Optionally, when the hologram is a computer generated hologram, the computer generated hologram is a mathematical transformation of the holographic reconstruction. Optionally, when the hologram is a computer generated hologram a memory may be provided to store the holographic data representing the hologram. Optionally, the computer generated hologram is a Fourier transformation or a Fresnel transformation of the holographic reconstruction. Optionally, the computer generated hologram is a Fourier hologram or a Fresnel hologram. Optionally, the computer generated hologram is generated by a point cloud method.

Any of the above described optional embodiments can be combined in any suitable combination. Moreover, although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

The term "hologram" is used to refer to the recording which contains amplitude information or phase information, or some combination thereof, about the object. The term "holographic reconstruction" is used to refer to the optical reconstruction of the object which is formed by illuminating the hologram. The term "replay field" is used to refer to the area within which the holographic reconstruction is formed. If the hologram is displayed on a spatial light modulator comprising pixels, the replay field will be repeated in the form of a plurality diffracted orders wherein each diffracted order is a replica of the zeroth order replay field. The zeroth order replay field corresponds to the preferred or primary replay field. Unless explicitly stated otherwise, the term "replay field" should be taken herein to refer to the zeroth order or primary replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane, as described further herein.

BRIEF DESCRIPTION OF THE DRAWINGS

Specific embodiments are described by way of example only with reference to the following figures:

FIGS. 7A, 7B, 7C, 7D, 7E and 7F illustrate movement of image regions for the arrangements shown in FIGS. 5 and 6;

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
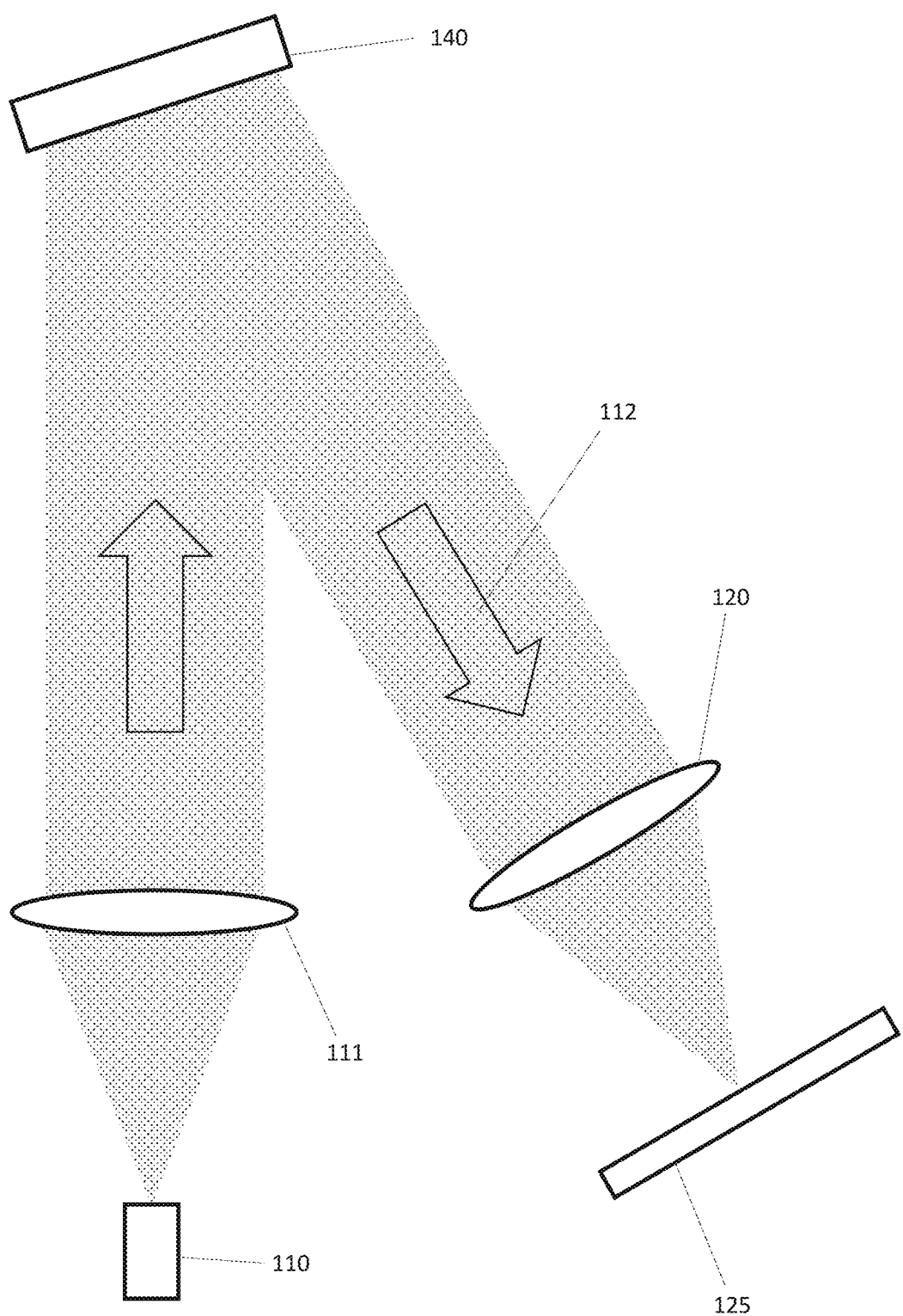
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
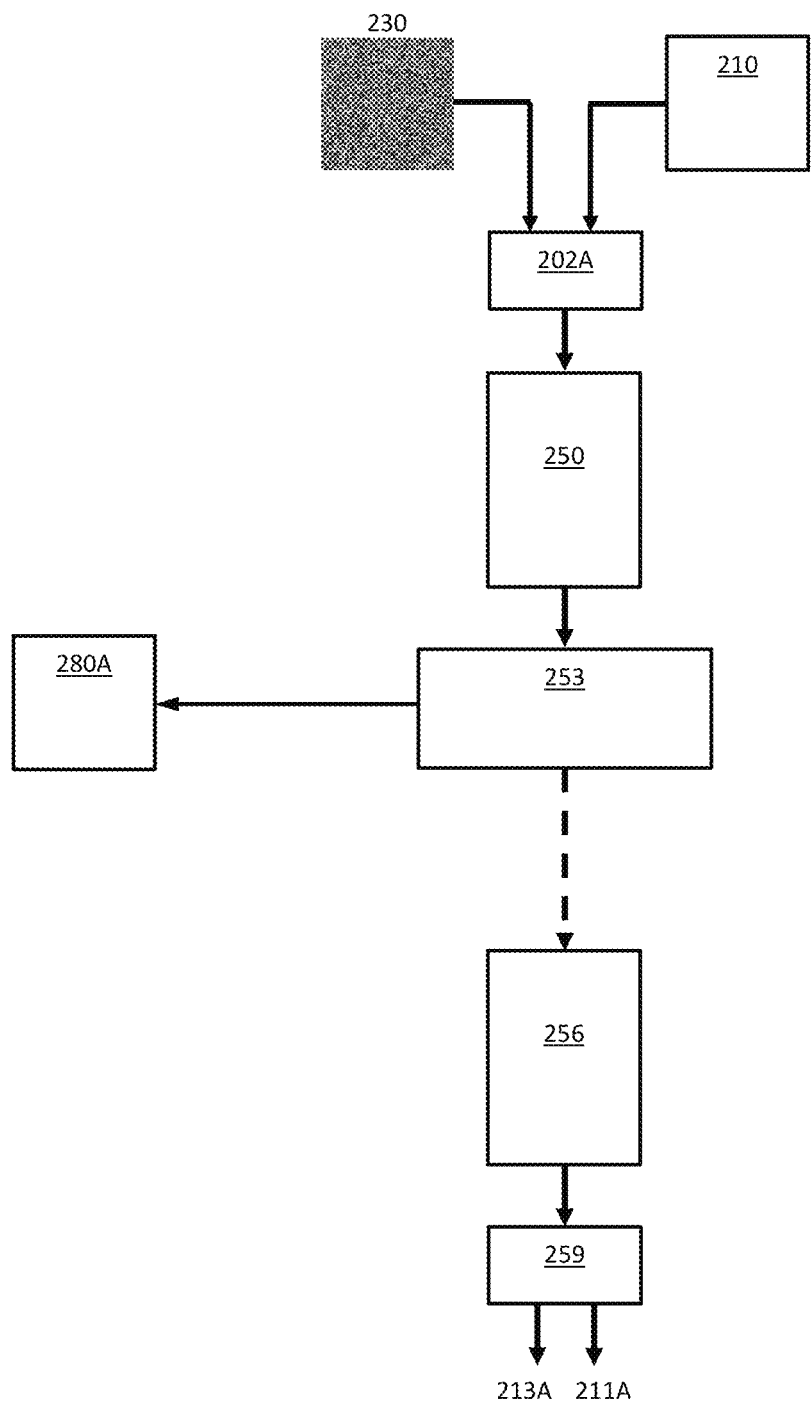
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and extracts the set of phase values. The second processing block 253 quantises each phase value to form hologram 280A. Each phase value is quantised in accordance with the phase-levels which may be represented on the pixels of the spatial light modulator which will be used to "display" the hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments). If the algorithm continues, second processing block 253 additionally replaces the magnitude values of the Fourier transformed complex data set with new magnitude values. The new magnitude values are a distribution of values representative of the magnitude distribution of the light pattern which will be used to illuminate the spatial light modulator. In some embodiments, each new magnitude value is unity. In other embodiments, second processing block 253 processes the magnitude values of the second complex data set—for example, performs a mathematical operation or series of mathematical operations on each magnitude value—to form the new magnitude values. Second processing block 253 outputs a complex data set comprising the quantised phase values and the new magnitude values.

Third processing block 256 receives the complex data set output by the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and assesses the distribution of magnitude values 211A. Specifically, the fourth processing block 259 compares the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 determines that the hologram 280A is acceptable. That is, if the difference between the distribution of magnitude values 211A and the input image 210 is sufficiently small, the fourth processing block 259 determines that the hologram 280A is a sufficiently-accurate representative of the input image 210. In some embodiments, the distribution of phase values 213A of the inverse Fourier transformed complex data set is ignored for the purpose of the comparison.

It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm is performed.

Figure 2B:
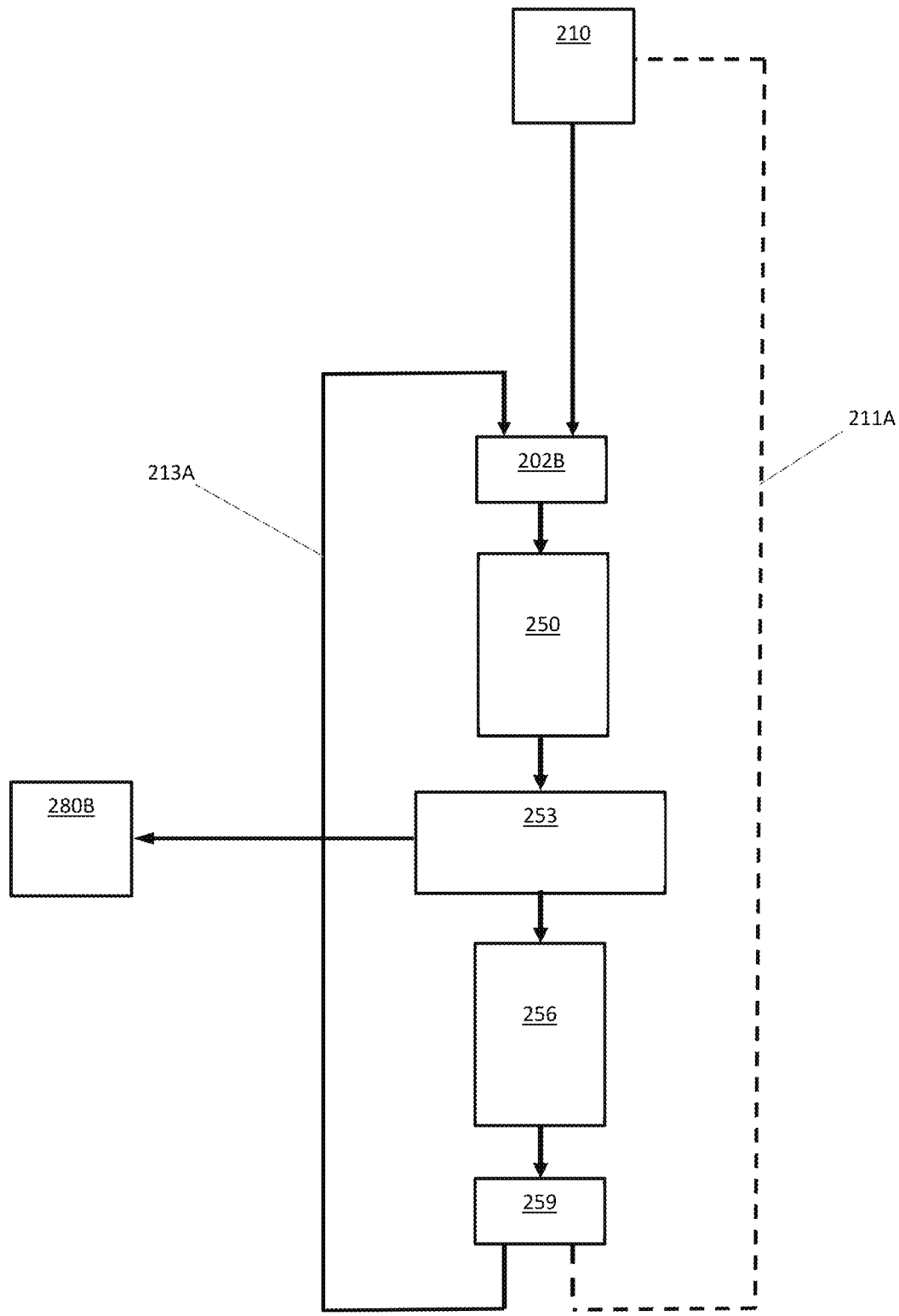
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
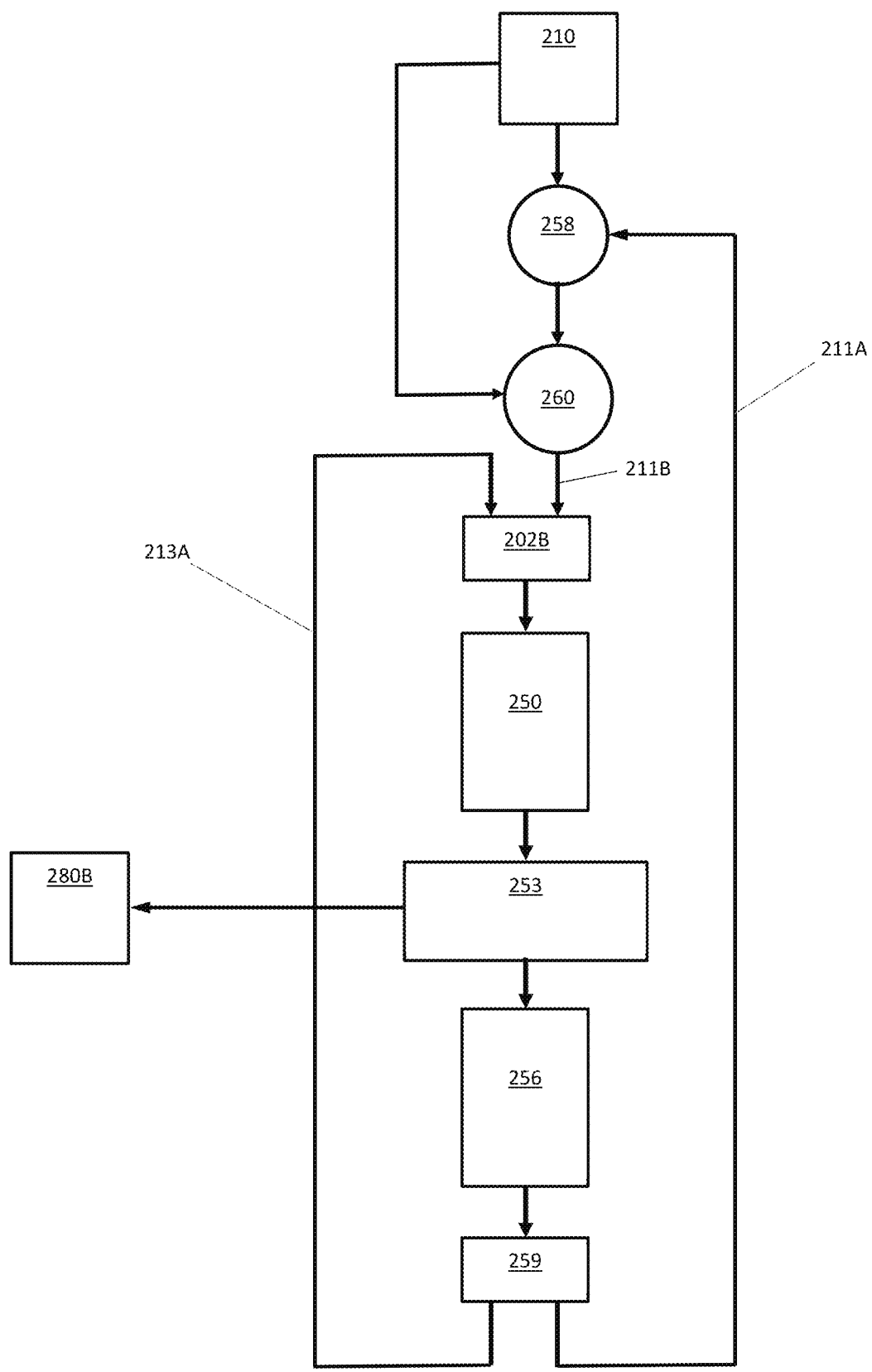
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(R_n[x,y]|-T[x,y])$$

where:
F' is the inverse Fourier transform;
F is the forward Fourier transform;

R[x, y] is the complex data set output by the third processing block 256;

T[x, y] is the input or target image;

∠ is the phase component;

ψ is the phase-only hologram 280B;

η is the new distribution of magnitude values 211B; and

α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number. The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed computationally by combining lensing data with the hologram data. That is, the diffractive pattern displayed on the spatial light modulation comprises hologram data representing the object and lens data representative of a lens. In these embodiments, the physical Fourier transform lens 120 of FIG. 1 is omitted. It is known in the field of computer-generated holography how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition.

In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as beam steering. Again, it is known in the field of computer-generated holography how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
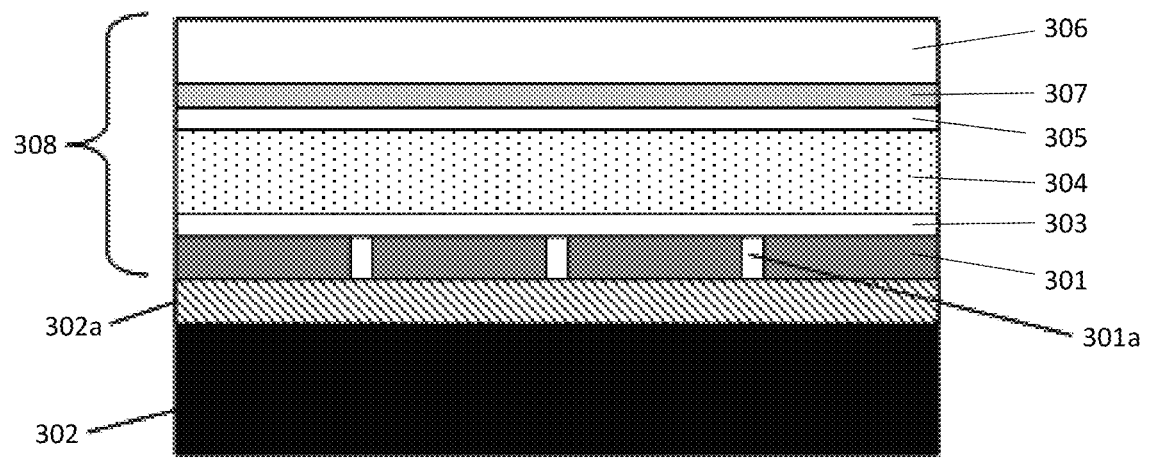
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the liquid crystal layer 304 and a planar transparent layer 306, e.g. of glass, is disposed on the second alignment layer 305. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Wavelength Measurement

Figure 4:
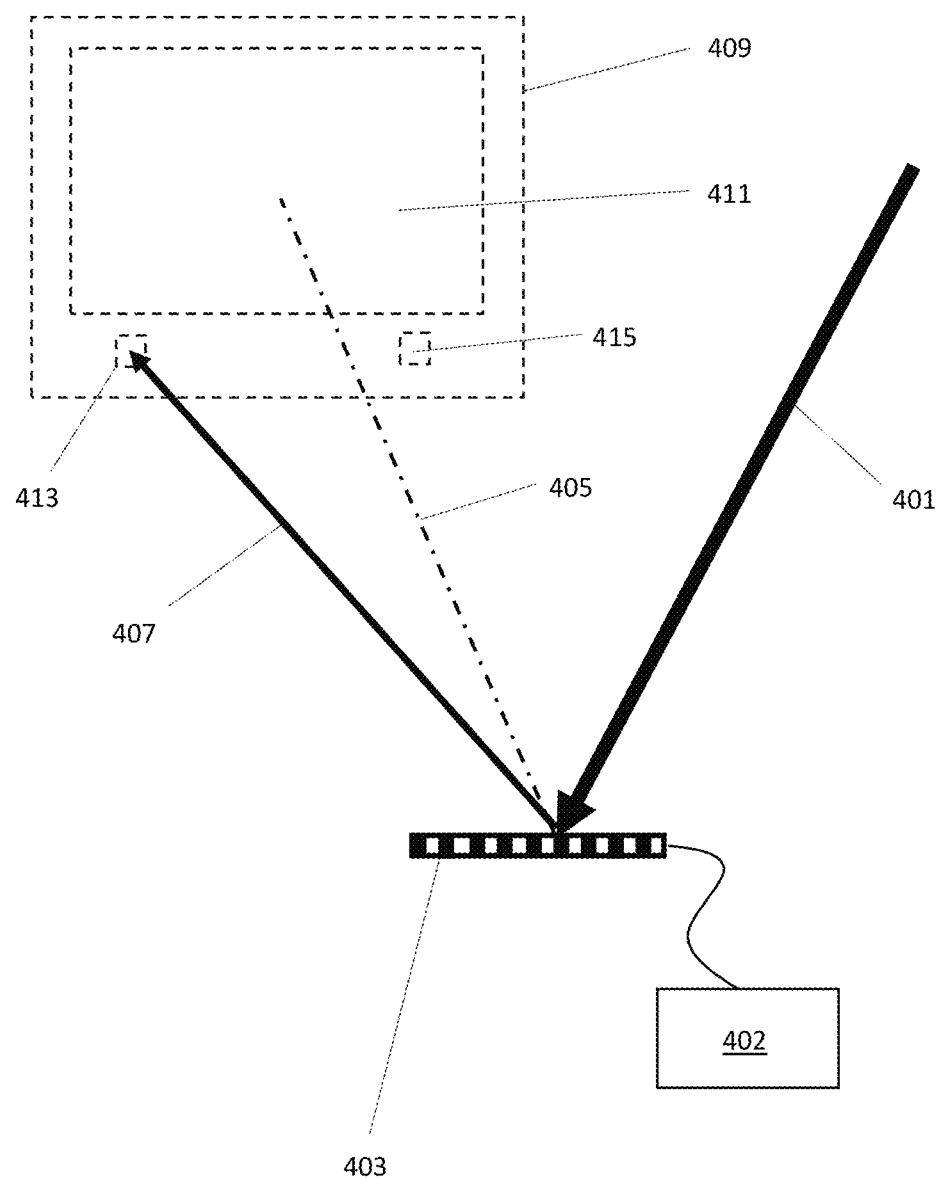
FIG. 4 illustrates a wavelength measurement system for measuring a wavelength of light.

A projection system arranged to calculate a wavelength of light from a light source is described with reference to FIG. 4. A light source is arranged to output light 401 having a wavelength. The light 401 in this embodiment is a beam of collimated light from a laser light source. The light 401 is incident upon a spatial light modulator (or SLM) 403, which is arranged to receive the laser light 401 from the laser light source. SLM 403 is arranged to display a real image of a diffraction grating in order to spatially modulate the received light 401 in accordance with the diffraction grating displayed on SLM 403 to form an image in replay field 409. The diffraction grating displayed on the SLM 403 can be a blazed, or echelette, grating. A blazed grating is optimized to achieve maximum grating efficiency in a given diffraction order. However, any other suitable form of diffraction grating can be used. For example, the diffraction grating can be a Ronchi grating with alternate columns of 0 and $\pi$ phase delay to cause diffraction.

Replay field 409 is associated with the projection system. The replay field 409 is a region of space into which light can be projected. The replay field 409 comprises a primary image region 411 in which information for a user can be projected. Primary image region 411 is the region of replay field 409 where the primary image would be if a hologram was displayed on the SLM rather than a diffraction grating. For example, when the projection system is deployed in an automobile, information for display to a driver (such as the speedometer) can be provided in the primary image region 411. Information used for control of the projection system can also be projected into the replay field 409, preferably into areas outside of the primary image region 411. These areas can be termed secondary image regions, or image control regions.

There are two types of diffraction which contribute to the resulting diffraction pattern. Namely, there is the diffraction pattern due to the grating displayed on the SLM, which is repeated in space due to the diffraction of the incident light at the grating formed by the pixels of the SLM 403 (a 'pixel grating' due to the spacing of the regular arrangement of pixels). In effect, the displayed diffraction grating and the pixel grating are multiplied in Fourier space, the result of which is the convolution of the grating diffraction pattern with the pixel diffraction pattern in real space. In other words, the diffraction pattern due to the displayed diffraction grating is repeated at the points in space which correspond to the diffraction pattern due to the pixel grating.

This repetition in space of the diffraction pattern from the displayed diffraction grating can be referred to as multiple replay fields, each of which corresponds to the peaks of the diffraction pattern formed from the pixel grating—the different replay fields can thus be referred to as representing different replay field orders. Typically, only the zero-order replay field is used for display. In some embodiments, replay field 409 is the zero-order replay field. For simplicity, only the primary or zero-order replay field 409 will be considered here, because higher order replay fields are typically blocked out.

Within replay field 409, there are different diffraction orders of light corresponding to the diffraction pattern due to the diffraction grating displayed on the SLM. In this way, the image formed in replay field 409 (i.e. the diffraction pattern due to the displayed diffraction grating) comprises undiffracted, or zero-order, light 405 and light diffracted by the diffraction grating of a higher diffraction order (e.g. first order diffracted light, second order diffracted light, and so on). For example, the image forming the diffraction pattern comprises a spot of un-diffracted light, spots of first order diffracted light around the un-diffracted light spot, spots of second order diffracted light around the first order diffraction light spots, etc. Detector 413 may be placed to intercept the −1 diffraction order in a region of the image and detector 415 may be placed to intercept the +1 diffraction order in another, second, region of the image. In this arrangement, light 407 represents the −1 diffraction order, but is herein referred to more generally as 'first order diffracted light'.

A light detector arrangement is associated with the replay field 409. The light detector arrangement is located within the replay field 409, but outside of the primary image region 411 so as not to interfere with the display of information to a user. Preferably, the light detector arrangement is arranged to detect light from a fixed point in the replay field 409. The light detector arrangement can be a single detector comprising multiple detector regions, or the detector arrangement can comprise separate, independent, detectors each comprising a distinct detector region. In this arrangement, the detector arrangement comprises a separate first detector 413 and second detector 415, but in other arrangements only one detector 413 may be provided within the detector arrangement. Alternatively, more than two detectors may be provided, as needed. The detectors 413 and 415 are in this arrangement photodiodes, but any other suitable type of light detectors may be used.

In the following description, the image formed in the primary replay field 409 from the diffraction of light incident upon the SLM 403 is formed of a spot of un-diffracted light 405 and first order diffracted light spot 407, diffracted by the diffraction grating displayed on the SLM 403. The image may also contain additional spots of first order diffracted light, as well as light spots formed from higher orders of diffracted light (e.g. second order diffracted light). The first order diffracted light 407 is here formed in the secondary image region of the replay field 409. Detector 413 is arranged to detect an intensity of light 407 and output a signal representative of the detected intensity. Here, the intensity of light 407 is the intensity of light travelling to or from the spot of first order diffracted light 407. However, in other arrangements the detector arrangement can be arranged to detect light and output a signal representative of a position of spot 407 relative to the detector based on the detected light.

It is known that a change in the wavelength of light incident upon a diffraction grating, or a change in the periodicity (or diffraction spacing) of the diffraction grating will result in a corresponding change in the diffraction angles of the different orders of diffracted light. For example, the position of first order diffracted light spot 407 in the replay field 409 is dependent on the wavelength ($\lambda$) of incident light 401 and the diffraction spacing (d) of the diffraction grating displayed on the SLM 403 through the following relationship:

$$m\Lambda = d\sin(\theta),\qquad \text{(Equation 1)}$$

where θ is the angle of diffraction relative to an optical axis of the undiffracted light and m is the 'order number' of the diffracted light spots (i.e. first order diffracted light spot 407 has order m=−1; second order diffracted light has order m=2, etc). Undiffracted light, or zero order light, has order number m=0 and appears as a bright spot in the centre of each replay field. Equation 1 can be used to calculate the wavelength of incident light 401 in-situ. To facilitate a simplified calculation of the wavelength, the positions of the detector 413 and the SLM 403 are fixed relative to one another—this enables the diffraction angle to be easily calculated based on the position of the detector 413.

The SLM 403 is connected to a processor 402, which processor 402 causes the SLM 403 to display the diffraction grating. The processor 402 is also arranged to control the periodicity (or diffraction spacing) of the diffraction grating. Since the diffraction grating has a computer-controlled periodicity, the diffraction grating displayed on the SLM 403 can be changed in software by the processor 402. This means that a simple and efficient system for measuring the wavelength without hardware changes is provided, which can facilitate an improved method of measuring the wavelength of light 401 in-situ.

The processor 402 is arranged to cause the SLM 403 to display the diffraction grating in order to diffract the received light 401 and form the image. Since the image of this embodiment is formed from first order diffracted light 407, a position of the image is dependent on the diffraction grating displayed on the SLM 403 and the wavelength of the incident light 401. The detector 413 is arranged to detect an intensity of light of the image and output a signal representative of the detected intensity, and the processor 402 is configured to receive the signal.

The intensity of the first order diffracted light spot 407 can be pre-calculated or pre-measured based on the intensity of the incident light 401, the wavelength of the incident light 401 and the characteristics of the diffraction grating displayed on the SLM 403. In other words, for a given arrangement of components the first order diffracted light spot 407 has an expected intensity which can be predetermined or predefined and then stored within a memory of processor 402 for use in the calculation of the wavelength of the light 401.

In particular, the processor 402 receives the signal representative of the intensity from the detector 413 and compares this predetermined or predefined (the 'expected') intensity to the intensity of light detected by the detector 413. If the detected intensity matches the expected intensity, or is above a threshold set based on the expected intensity, the position of the image can be said to at least partially overlap, or coincide, with the position of the detector 413. The angle of diffraction of the diffracted light spot 407 can then be calculated based on the position of the detector 413 relative to the optical axis of the light output by the SLM 403 (i.e. the optical axis along which the undiffracted light 405 travels). Since the order, m, of the chosen diffracted spot (whether that be first order diffracted light spot 407, or a second order diffracted light spot) is known, and the characteristics of the diffraction grating displayed on the SLM 403 are known, the wavelength of light can be calculated in accordance with Equation 1.

The processor 402 is configured to change the diffraction grating displayed on the SLM 403; since the diffraction angle is dependent on the periodicity or diffraction spacing of the diffraction grating for a given wavelength, adjusting or changing the diffraction grating adjusts the position of the image in space by changing the diffraction angle. If the detected intensity does not match the expected intensity, this indicates that the location or position of the first order diffracted light spot 407 does not correspond to the position of the detector 413; the processor 402 then changes the diffraction grating displayed on the SLM 403 and the intensity of the diffracted light spot 407 is again detected by the detector 413. Here, changing the diffraction grating comprises changing a diffraction spacing of the diffraction grating. This process can be repeated until the intensity detected by the detector 413 matches the expected intensity, for example, or is above a predetermined intensity threshold, depending on the detection method. The angle of diffraction is then used in combination with the diffraction spacing of the diffraction grating displayed on the SLM 403 to calculate the wavelength of the input light 401 in accordance with Equation 1.

The accuracy of the above described wavelength calculation can be improved by repeating the above calculation steps with a diffraction spot of a different diffraction order, using a different diffraction grating. For example, a diffraction grating can be chosen and displayed on the SLM so that a second order diffracted light spot of the image within the replay field 409 is formed in the vicinity of the detector 413. The detector 413 is arranged to detect an intensity of the second order diffracted light spot and output a signal representative of the detected intensity, or arranged to detect light and output a signal representative of a position of the second order diffracted light spot relative to the detector based on the detected light.

In this way, it is determined if the second order diffracted light spot at least partially overlaps or coincides with the detector 413. The processor 402 is configured to change the diffraction grating displayed on the SLM 403 until the intensity detected by the detector 413 matches the expected intensity for a second order diffracted light spot, for example, or is above a predetermined intensity threshold, depending on the detection method. The angle of diffraction is then used in combination with the diffraction spacing of the diffraction grating displayed on the SLM 403 to re-calculate the wavelength of the input light 401 in accordance with Equation 1. This process can be further repeated with a diffraction spot of a different diffraction order to further increase the accuracy of the wavelength calculation.

The system described above with respect to FIG. 4 can be used to calculate the wavelength of light 401. However, the system can also be used to verify that the wavelength of the light 401 incident on the SLM 403 is the desired or intended wavelength. For example, if there is a fluctuation or deviation in the wavelength of the light 401 then the position of the first order diffracted light spot 407 will not overlap with the position of the detector 413, and the intensity of light detected by the detector 413 will not match the expected intensity. This arrangement facilitates a quick and efficient verification of whether or not the wavelength of incident light 401 is the desired or intended wavelength—the actual wavelength of the light 401 need not be calculated.

The processor 402 can be further configured to adjust the light source in dependence on the verification or calculation process to compensate for the difference in wavelength of light 401 from the intended or desired wavelength. This compensation can improve the quality of subsequent holographic reconstructions formed using the projection system, for example. When the light source is a laser, this adjustment can involve adjusting a temperature of the laser cavity to cause a change in the laser wavelength.

Wavelength Change Detection

Figure 5:
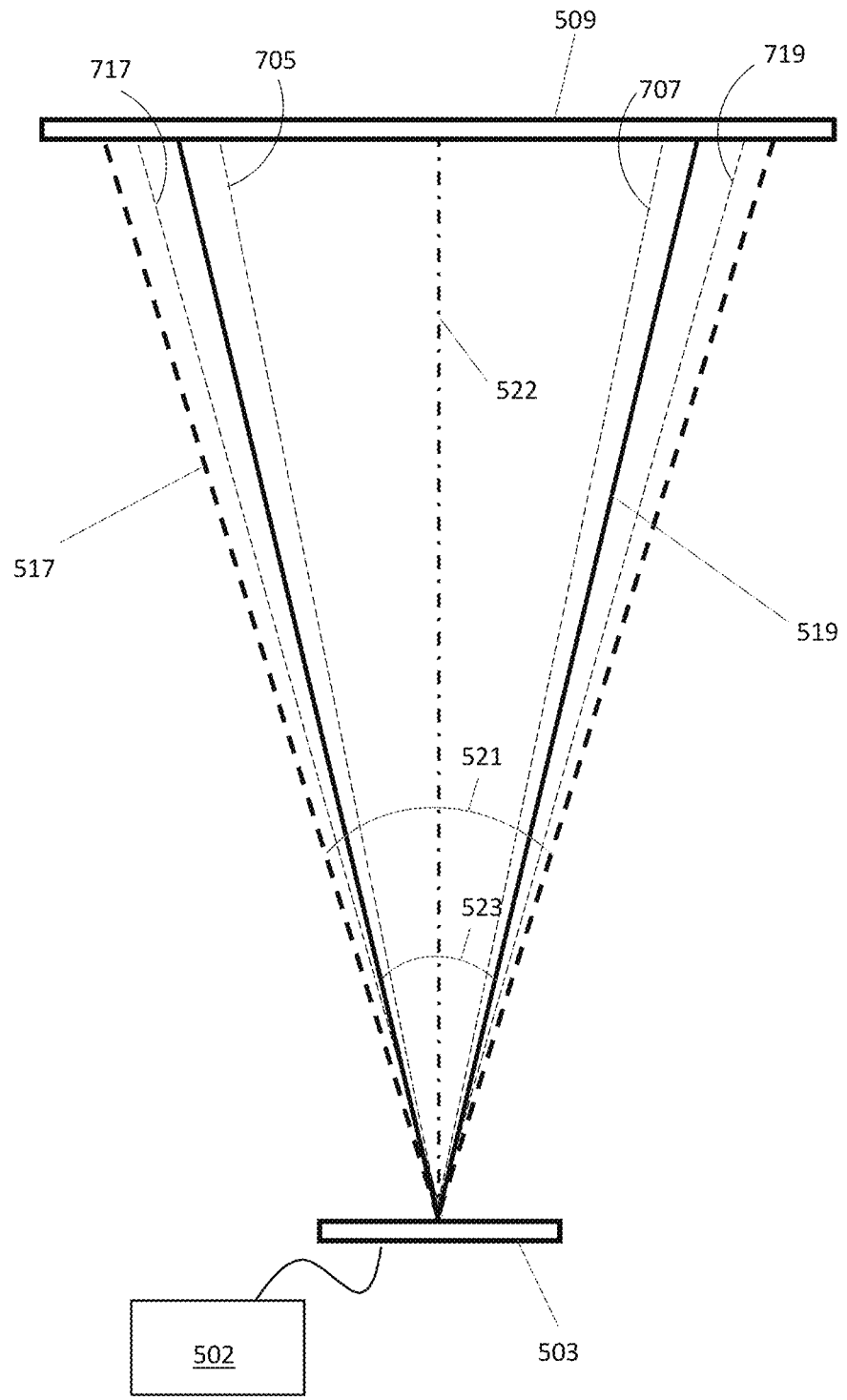
FIG. 5 shows a replay field size for different wavelengths of light.

A projection system arranged to detect a change in a wavelength of light from a light source is described with reference to FIG. 5. The system comprises a spatial light modulator, or SLM, 503 which is connected or coupled to a processor 502. The processor 502 causes the SLM 503 to display a diffractive pattern comprising a computer-generated hologram. The SLM 503 receives incident light having a wavelength from a light source and spatially modulates the incident light in accordance with the computer-generated hologram to form an image within a primary replay field at replay plane 509. Here, as in the system described above with respect to FIG. 4, the light source is a laser source and the incident light is a collimated beam of coherent light.

The image is a holographic reconstruction of the computer-generated hologram and is formed by diffraction. The image comprises a primary image region comprising information for a user (for example a holographic reconstruction of an original image or object represented by the computer-generated hologram displayed on the SLM 503) and first and second control image regions. These first and second control image regions are located outside of the primary image region, in a secondary image region of the replay field. The first and second control image regions comprise diffracted light formed by the displayed hologram.

In this arrangement, the light in the first and second control image regions can be considered as 'control spots', that is, focused spots of diffracted light located outside the primary image region for use in the control of the projection system. The image comprising the primary image region and the first and second control image regions is formed within primary replay field 519 at replay plane 509. Replay field 519 has angular extent 523, centred around an optical axis 522 of the spatially modulated light output from the SLM 503. In other words, the size of the replay field 519 in which the image is formed is dependent on angle 523.

The system further comprises a detector arrangement. The detector arrangement is arranged to detect light travelling to or from the first control image region and light travelling to or from the second image region. The detector arrangement is arranged to output a first signal representative of a position of the first control image region based on the detection of light of the first control image region, and to output a second signal representative of a position of the second control image region based on the detection of light in the second control image region. The detector arrangement described herein comprises two separate detectors. The two detectors are camera arrangements, each of which monitors the position of one of the control spots (i.e. one of the control image regions), although any other suitable detector arrangement that can measure the position of each control spot can be employed in corresponding embodiments.

The processor is arranged to receive the first and second signals representative of the positions of the first and second control image regions from the detector arrangement and determine the relative position of the first and second control image regions based on the first and second signals. In other words, the processor is arranged to monitor the separation of the first and second control image regions within the replay field 519.

As discussed above with respect to FIG. 4, the position of the first and second control image regions is dependent on the wavelength of incident light and the extent to which that incident light is diffracted. The extent 523 of the replay field 519 is dependent on the wavelength and the spacing of the pixels of the SLM 503. The diffraction of the light forming the image comprising the first and second control image regions is diffracted in accordance with the diffractive pattern displayed on the SLM—this diffractive pattern can be just the computer-generated hologram, or a combination of the hologram and a second diffractive pattern such as a grating function component, which has a defined diffraction spacing.

For a given SLM 503 and a given diffractive pattern comprising the computer-generated hologram, a change in wavelength causes a change in the diffraction angle and thus a change in the positions of the first and second control image regions—i.e. when the wavelength of the incident light changes (for example due to temperature fluctuations in the laser cavity), the positions of the control image regions also change. Consequently, the angular extent of the replay field containing the image comprising the first and second control image regions changes as a result of the wavelength change. By monitoring the relative position of the two control spots, i.e. by monitoring their separation, a change in wavelength can be detected. For example, if the wavelength of the incident light increases, the angle of diffraction also increases, resulting in a larger replay field 517 having an angular extent 521 larger than angle 523. In other words, the change in the wavelength causes a change in the replay field size. This change in image size can be defined as follows, where L is the distance to the replay plane 509 of the optical system and θ is the diffraction angle:

$$\text{image size}=2L\tan(\theta). \quad \text{(Equation 2)}$$

This change in the relative position of the first and second control image regions, resulting from a change in the replay field size, is detected by the detector arrangement monitoring the positions of the first and second control image regions, as will be described below. Such a relative change is indicative of a change in wavelength, and thus enables the wavelength change to be distinguished from a mere shift in a position of the entire replay field due to an optical misalignment or mechanical translation, as described below with reference to FIG. 6.

Misalignment caused by bumps or vibrations of the system, or by movement of components of the system result in a translation in the replay field, rather than a magnification or demagnification, as is caused by a wavelength change and described above with reference to FIG. 5. For example, incident light is spatially modulated by computer-generated hologram displayed on SLM 603, as described above, to form an image at replay plane 609. The image at the replay plane 609 comprises a primary image and first and second control image regions. In this arrangement, the light in the first and second control image regions can again be considered as 'control spots', that is, focused spots of light located outside the primary image region. Replay field 619 has an angular extent 623, and is here centred around an optical axis 622 of the spatially modulated light output from the SLM 603. In other words, the size of the replay field 619 at the replay plane 609 is determined by angle 623.

If the system is subjected to vibrations, a mechanical translation may occur. This translation causes optical misalignments within the system and results in a shift in the replay field at the replay plane 609. In particular, the replay field containing the first control image region and second control image region may no longer be centred around the optical axis 622, but instead may be skewed relative to the optical axis 622 to form replay field 617 with angular extent 621. Angle 621 is equal to angle 623—in other words, the image at replay plane 609 is the same size before and after the translation, it is just located at a different position in space because replay field 617 is shifted relative to replay field 619. The entire replay field has been translated, but there is no change in the relative position of the first and second control image regions (i.e. the separation of the two regions has not increased or decreased).

This is in contrast with the situation described above with reference to FIG. 5, in which the replay field is not translated but instead is magnified, or de-magnified, as a result of a change in the wavelength of the incident light, so that the described arrangement is able to distinguish between changes due to translation/mechanical perturbation and changes due to a fluctuation/variation in wavelength. The scaling of the image 509 occurs in accordance with Equation 2, and the corresponding change in the relative position of the first and second control image regions acts as a confirmation that any detected change is a result of a change in the wavelength change, rather than a mechanical translation (i.e. due to an impact of a vibration in the system). Any actual change in the wavelength can thus be appropriately compensated for, without the risk of distorting the image based on a perceived, but erroneous, detection of wavelength fluctuation.

The projection system described herein can facilitate the use of in-situ detection of a change in wavelength, thereby enabling appropriate compensation or corrections to be applied on the fly to improve the quality of the image displayed in the primary image region. In-situ detection in this manner can also allow wavelength changes due to both temperature fluctuations and hardware variations to be compensated for simultaneously, thereby reducing the time and expense for end of line hardware testing, and removing the need to perform in-situ mapping of the wavelength as a function of temperature. In this way, the quality of the image provided to a user can be improved in a simpler, more efficient, manner.

The process by which wavelength changes are distinguished from mechanical translations in the present system is described below in more detail. With reference to FIGS. 7A and 7B, and as described above with reference to FIGS. 5 and 6, the projection system comprises a detector arrangement. The detector arrangement comprises a first detector region 701 and a second detector region 703, said detector regions being located within the image area (i.e. area of image located at replay plane 509/609) in order to detect the light in the image control regions. Here the first detector region 701 corresponds to a first CCD and the second detector region 703 corresponds to a second CCD, but any other suitable detector arrangement can be employed. When the system is in optical alignment and the wavelength of the incident light from the light source is equal to the intended wavelength, the control spot of the first image control region (first control spot) is positioned at position 705 within the first detector region 701 and the control spot of the second image control region (second control spot) is positioned at position 707 within the second detector region 703.

Figure 6:
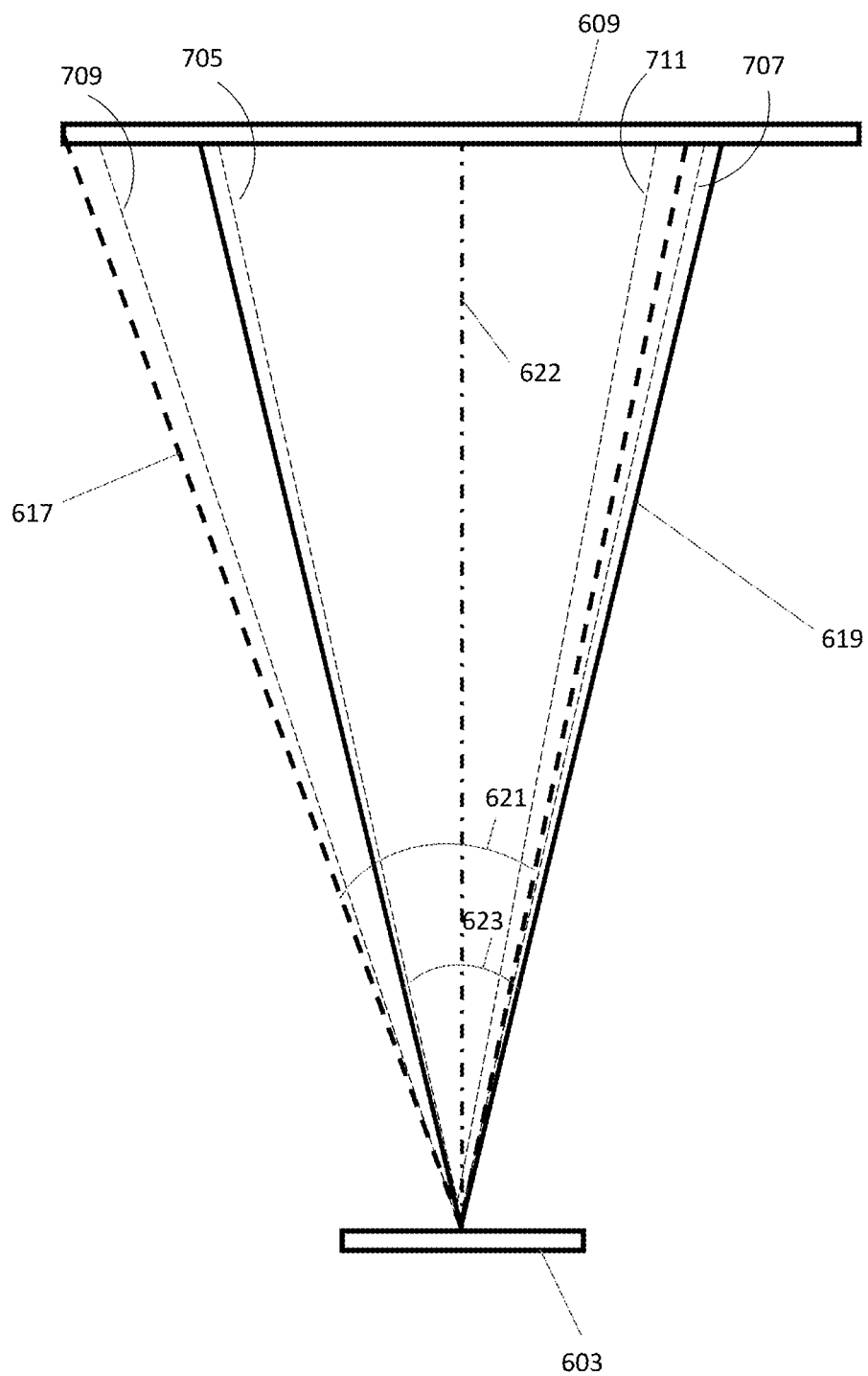
FIG. 6 shows a translation in a replay field due to misalignment.

As described with reference to FIGS. 7C and 7D and shown in FIG. 6, when the system is subjected to a mechanical misalignment the positions of the control spots translate equally, such that the image (for example, the image at replay plane 609) is translated. For example, there could be a mechanical vibration causing an optical misalignment to the left, where the position of the first control spot is shifted from position 705 to position 709 and the position of the second control spot is shifted from position 707 to position 711, as shown in FIG. 6. Alternatively, there could be an optical misalignment to the right, where the position of the first control spot is shifted from position 705 to position 713 and the position of the second control spot is shifted from position 707 to position 715. In both cases, the image is translated in space.

In contrast, as described with reference to FIGS. 7E and 7F and shown in FIG. 5, when the wavelength of the incident light changes the control spots move together or further apart such that the image (for example, the image at replay plane 509) is scaled in accordance with Equation 2 above. For example, when the wavelength increases the position of the first control spot is shifted from position 705 to position 717 and the position of the second control spot is shifted from position 707 to position 719 and the image is magnified, as shown in FIG. 5. Alternatively, when the wavelength decreases the position of the first control spot is shifted from position 705 to position 721 and the position of the second control spot is shifted from position 707 to position 723 and the image is de-magnified. In other words, there is a change in the radial distance of both the first and second control image regions relative to a centre of the SLM. This change in the radial distance can be used to calculate the fractional change in the wavelength of the light, either by considering the relative position of the two control image regions, or by determining a fractional change in the radial distance of just one spot.

As such, the detector arrangement can distinguish from the arrangement described with reference to FIGS. 7C and 7D and the arrangement described with reference to FIGS. 7E and 7F based on the relative position of the control spots, or light, of the first and second control image regions. This is advantageous, since scaling or translations of the image displayed to a user need to be compensated for differently, as described below in more detail. As such, the present projection system enables the application of appropriate compensation to restore a distorted image to the original, intended, image.

It can be sufficient to simply detect a change in the wavelength in order to correct for the wavelength change, but in some implementations it may be necessary to actually quantify the wavelength change in order to apply an appropriate adjustment or compensation. The processor is therefore optionally further arranged to calculate the wavelength of light. Advantageously, this calculation can be performed in-situ in any suitable manner.

Figure 8:
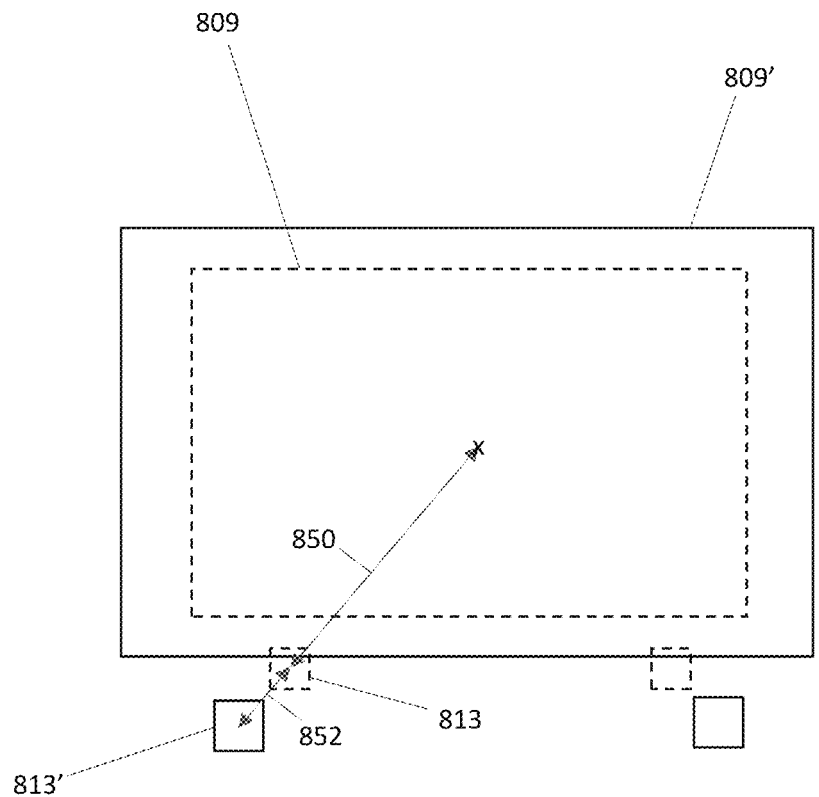
FIG. 8 illustrates a scaling of the replay field due to a change in wavelength.

In one arrangement, the processor 502 may be configured to calculate a fractional change in the wavelength of the output light from a fractional change in the relative position of the first and second control image regions, as described with reference to FIG. 8. The original image (formed by spatially modulating light incident on the SLM 503 in accordance with the computer-generated hologram) comprises a primary image region 809 containing information for display to the user, and first and second control image regions 813 located outside the primary image region 809. The distance between a spot in the centre (x) of the primary region 809 and the centre of the first image control region 813 is distance 850.

When the wavelength of the incident light increases, the size of the replay field increases in a corresponding manner, as described above with reference to FIG. 5. The primary image region 809' after the wavelength increase is larger than the primary image region 809 displayed previously, and after the wavelength increase the first image control region 813' is larger and further away from the centre (x) of the primary image region 809' than before the wavelength increase—the distance between the centre (x) and the centre of the first image control region 813' is now the sum of distance 850 and distance 852. The fractional change in the radial position of the first control image region 813' from the centre (x) of the primary image region is the distance 852 divided by the distance 850 (or 852/850), which fractional change is proportional to the fractional change in the wavelength of the incident light. Provided the original wavelength of the incident light is known, the new wavelength can thus be calculated.

The processor can use this fractional change in the wavelength to adjust the light source in order to restore the wavelength of the incident light to the intended, or desired, wavelength and thus correct image 809' back to image 809, for example. For example, when the light source is a laser the temperature of the laser cavity can be adjusted to change the wavelength of the light output by the laser. Alternatively, the computer-generated hologram can be adjusted or changed in response to the detected movement of the first and second image control regions. In some examples, particularly when the change in the wavelength is small, the computer-generated hologram can be changed such that the diffraction spacing experienced by the light incident on the SLM 503 is changed, but the image content in the primary image region remains the same. In other words, the diffraction grating is changed which has a corresponding change on the angular extent of the replay field, as described above with reference to FIG. 5—image 809 can thus be restored by magnifying or de-magnifying the image 809' as appropriate through a change in the diffraction spacing (either by changing the hologram, or by changing a second diffractive pattern of the diffractive pattern displayed on the SLM).

Figure 9:
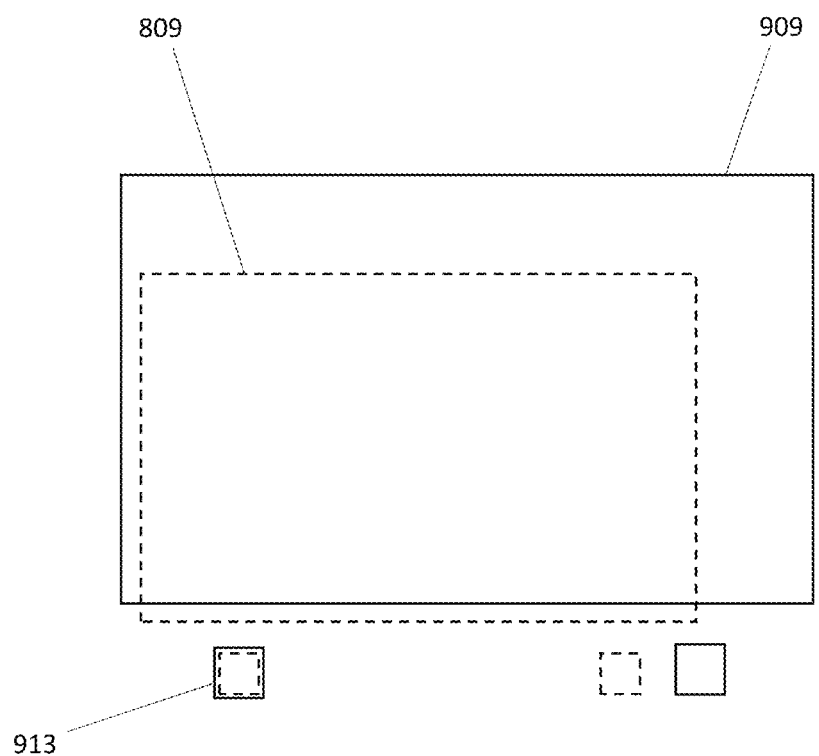
FIG. 9 illustrates the effect of translation on a scaled replay field.

However, as described with reference to FIG. 9, although a first control image region 913 may be brought back to its original position by changing the diffraction grating, the resulting image 909 may not correlate to the original image 809 before the wavelength change and compensation. Moreover, it is not possible to simply translate the computer-generated hologram displayed on the SLM 503 in order to translate image 909 and thereby restore original image 809, since the change in wavelength can cause a significant scaling in the size of the image (as described by Equation 2). Therefore, the computer-generated hologram may need to be adjusted or changed to include a magnifying or de-magnifying component in order to alter transform image 909 back to original image 809. One method for achieving such a magnification/de-magnification is described in Lin et al, 'A holographic projection system with an electrically tuning and continuously adjustable optical zoom', Optics Express, volume 20, number 25, 2012, pages 27222-27229 (the contents of which is hereby incorporated by reference).

In another embodiment, the processor may be configured to calculate the wavelength of the light directly, rather than based on a fractional change in the relative position of the first and second control image regions. This direct measurement can be achieved in the manner described above with reference to FIG. 4, i.e. by displaying a diffraction grating on the SLM 503 and then using the processor 502 to change the diffraction grating until the position of a first order diffracted light spot at least partially overlaps with a position of the first detector 413. The wavelength can be further verified by adjusting the diffraction grating displayed on the SLM 503 and checking that a position of a second order diffracted light spot at least partially overlaps with a position of the second detector 413, for example.

In another embodiment, the processor 502 can be arranged to calculate the wavelength of the light directly by turning off the SLM 503 so that no computer-generated hologram is displayed to use the pixels of the SLM 503 as a diffraction grating. In other words, the wavelength can be calculated by using the regular array of pixels of the SLM 503 as a physical diffraction grating to diffract the light received from the light source and from image 509. As discussed above, the regular array of pixels of the SLM 503 results in multiple replay fields formed at the replay plane 509. When no diffraction grating is displayed on the SLM, these different orders of the replay field are simply represented by spots of diffracted light. The positions of these different orders of the replay fields in the replay plane, or different orders of diffracted light, can be used to determine the wavelength of the light. The replay field 409 described above corresponds to the zero-order replay field, with the higher order replay fields distributed around the zero-order replay field in accordance with the spacing of the pixels of the SLM 503 and the wavelength of the incident light.

Light from these replay fields can be detected using the detector arrangement, which is arranged to output a signal representative of the position of the various replay fields. Here the detector arrangement comprises a CCD or other camera arrangement. The diffraction angle can then be calculated based on the relative position of the SLM 503 and the detected positions of the replay fields based on the geometry of the projection system. The processor 502 is then arranged to calculate the wavelength of the output light based on the spacing of pixels of the SLM 503 and the calculated angle of diffraction in accordance with Equation 1.

The diffractive pattern can optionally comprise a second diffractive pattern, for example a grating function component, in combination with the computer-generated hologram. Changing the diffractive pattern can comprise changing one, or both, of the computer-generated hologram and the grating function component. In an embodiment, the processor 502 can be arranged to calculate the wavelength of the light incident on the SLM 503 using the diffractive pattern comprising the computer-generated hologram displayed on the SLM. In particular, the processor 502 is configured to change the grating function of the diffractive pattern displayed on the SLM 503 to adjust the positions of the first and second control image regions. As discussed above, the detector arrangement, which here includes first detector region 413, is arranged to determine if a position of the first control image region at least partially overlaps with a position of the first detector region 413 and to output a first signal representative of the position of the first control image region. If there is no overlap, the processor 502 is arranged to change the grating function of the diffractive pattern to adjust the position of the first control image region until there is at least partial overlap with the first detector region 413. The processor 502 can then determine the angle of diffraction corresponding to the grating pattern which gives rise to the overlap and calculate the wavelength of the light based on the determined angle of diffraction and the diffraction spacing of the grating function of the diffractive pattern comprising the computer-generated hologram in accordance with Equation 1.

Optionally, for verification of the wavelength, the detector arrangement, which here also includes a second detector region 415, is arranged to determine if a position of the second control image region at least partially overlaps with a position of the second detector region 415 and to output a second signal representative of the position of the second control image region. The processor 502 is further configured to receive the second signal and determine, based on the second signal, whether there is also overlap between the second image control region and the second detector region 415. If there is not overlap between the two, the processor 502 is arranged to change the computer-generated hologram until a computer-generated hologram is displayed on the SLM 503 which gives rise to both the least partial overlap of the first control image region and the first detector region 413 and the at least partial overlap of the second control image region and the second detector region 415. The processor can then calculate an angle of diffraction corresponding to said determined computer-generated hologram based on the positions of the first 413 and second 415 detector regions, and calculate the wavelength of the light in accordance with Equation 1. Here, the first 413 and second 415 detector regions are separate photodiode detectors of the detector arrangement, but they may alternatively be separate but contiguous regions of a large detector arrangement, for example. The detectors need not be photodiodes, but could be any other suitable form of detector.

In any of the above described embodiments for calculating the wavelength of light incident on the SLM 503, the processor 502 may be arranged to determine that the position of the first control image region at least partially overlaps with the first detector region 413 of the detector arrangement if an intensity of light detected by the first detector region 413 is above a predetermined intensity threshold set based on an expected intensity of the first control image region. Optionally, the processor 502 may also be arranged to determine that the position of the second control image region at least partially overlaps with the second detector region 415 of the detector arrangement if an intensity of light detected by the second detector region 415 is above a predetermined intensity threshold set based on an expected intensity of the second control image region.

Independent of the manner in which the wavelength is calculated, the processor 502 is arranged to adjust the light source to compensate for detected wavelength change (or the calculated wavelength) and/or the processor 502 is arranged to adjust the computer-generated hologram to compensate for the detected wavelength change (or calculated wavelength), for example by incorporating a magnifying/de-magnifying component, as described above with reference to FIG. 9. By compensating or adjusting the light source and/or the computer-generated hologram in accordance with the wavelength change, the quality (for example the resolution and colour balance) of the holographic reconstruction, or image, to be displayed to a user can be continuously maintained, despite variations in the wavelength of the light source during use.

ADDITIONAL FEATURES

Embodiments refer to an optically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

In some embodiments, the size (number of pixels in each direction) of the hologram to be reconstructed is equal to the size of the spatial light modulator so that the hologram fills the spatial light modulator. That is, the hologram uses all the pixels of the spatial light modulator. In other embodiments, the size of the hologram to be reconstructed is less than the size of the spatial light modulator. Therefore, to fill the SLM part of the hologram is repeated in the unused pixels. This technique may be referred to as tiling, wherein the surface area of the spatial light modulator is divided up into a number of tiles, each of which represents at least a subset of the hologram. Each tile is therefore of a smaller size than the spatial light modulator.

The size of the holographic replay field (i.e. the physical or spatial extent of the holographic reconstruction) is determined by the pixel spacing of the spatial light modulator (i.e. the distance between adjacent light-modulating elements, or pixels, of the spatial light modulator). The smallest feature which may be formed in the replay field may be called a "resolution element", "image spot" or an "image pixel". Typically, each pixel of the spatial light modulator has a quadrangular shape, optionally, a rectangular or square shape. The Fourier transform of a quadrangular aperture is a sinc function and therefore each image pixel is a sinc function. More specifically, the spatial intensity distribution of each image pixel on the replay field is a sinc function. Each sinc function may be considered as comprising a peak-intensity primary diffractive order and a series of decreasing-intensity higher diffractive orders extending radially away from the primary order. The size of each sinc function (i.e the physical or spatial extent of each sinc function) is determined by the size of the spatial light modulator (i.e. the physical or spatial extent of the aperture formed by the array of light-modulating elements or spatial light modulator pixels). Specifically, the larger the aperture formed by the array of light-modulating pixels, the smaller the image pixels.

It is usually desirable to have small image pixels. It is also usual in display technology to want the maximum number of image pixels possible. However, degradation of image quality can occur if the density of image pixels in the replay field is too high. This degradation is due to interference between the various orders of adjacent sinc functions and results in, for example, a decrease in the signal-to-noise ratio of the holographic reconstruction. There is therefore a balance to be struck with the number of image pixels. In other words, there is an optimum number of image pixels or optimum range for the number of image pixels. It has been found that tiling an input hologram onto an output hologram can reduce such image degradation and increase image quality. Specifically, some embodiments implement the technique of tiling to minimise the size of the image pixels whilst maximising the amount of signal content going into the holographic reconstruction.

However, the resulting holographic reconstruction can still suffer from "speckle" if a coherent light source, such as a laser, is used. Speckle is well-known and is the result of interference of light scattered off an optically rough surface.

The quality of the holographic reconstruction may also be affect by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

The holographic reconstruction is created within the zeroth diffraction order of the overall window defined by the spatial light modulator. It is preferred that the first and subsequent orders are displaced far enough so as not to overlap with the image and so that they may be blocked using a spatial filter.

In embodiments, the holographic reconstruction is in colour. In examples disclosed herein, three different colour light sources and three corresponding SLMs are used to provide composite colour. These examples may be referred to as spatially-separated colour, "SSC". In a variation encompassed by the present disclosure, the different holograms for each colour are displayed on different area of the same SLM and then combining to form the composite colour image. However, the skilled person will understand that at least some of the devices and methods of the present disclosure are equally applicable to other methods of providing composite colour holographic images.

One of these methods is known as Frame Sequential Colour, "FSC". In an example FSC system, three lasers are used (red, green and blue) and each laser is fired in succession at a single SLM to produce each frame of the video. The colours are cycled (red, green, blue, red, green, blue, etc.) at a fast enough rate such that a human viewer sees a polychromatic image from a combination of the images formed by three lasers. Each hologram is therefore colour specific. For example, in a video at 25 frames per second, the first frame would be produced by firing the red laser for $\frac{1}{75}$th of a second, then the green laser would be fired for $\frac{1}{75}$th of a second, and finally the blue laser would be fired for $\frac{1}{75}$th of a second. The next frame is then produced, starting with the red laser, and so on.

An advantage of FSC method is that the whole SLM is used for each colour. This means that the quality of the three colour images produced will not be compromised because all pixels on the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced. Embodiments utilise the improved SSC technique disclosed in British patent 2,496,108 which is hereby incorporated in its entirety by reference.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A method of detecting a wavelength property of the light output from the light source in a holographic projection system, the method comprising:
   displaying a diffractive pattern comprising a computer-generated hologram on a spatial light modulator;
   receiving, at the spatial light modulator, light having a wavelength from the light source at a spatial light modulator;
   spatially modulating the received light in accordance with the displayed diffractive pattern comprising the computer-generated hologram to form an image at a display plane, the image comprising
      a primary image region comprising information for a user,
      a first control image region, and
      a second control image region spaced apart from the first control image region, wherein positions of the first and second control image regions are dependent on the diffractive pattern and the wavelength;
   detecting light travelling to or from the first control image region and, separately, detecting light travelling to or from the second control image region;

receiving a first signal representative of a position and/or a size of the first control image region based on the detection of light travelling to or from the first control image region, and receiving a second signal representative of a position and/or a size of the second control image region based on the detection of light travelling to or from the second first control image region; and determining from the first signal and the second signal a wavelength property of the light output from the light source, the wavelength property being a wavelength of the light output from the light source, based on the first signal and the second signal, or a change over time in a wavelength of the light output from the light source based on a change of the first signal and the second signal.

2. The method of claim 1, wherein the first signal single is representative of the size of the first control image and the second signal is representative of the size of the second control image.

3. The method of claim 1, wherein the first signal is representative of a first radial distance of the first control image from the spatial light modulator, and the second signal is representative of a second radial distance of the second control image from the second spatial light modulator, wherein the first radial distance is opposite in direction from the second radial distance.

4. The method of claim 1, further comprising adjusting the wavelength of the light output by the light source to compensate for the determined wavelength property.

5. The method of claim 1, further comprising adjusting the computer-generated hologram to compensate for the determined wavelength property.

6. The method of claim 1, wherein determining the wavelength property of the light output by the light source comprises calculating a fractional change in the wavelength of the output light from fractional changes in relative positions and/or sizes of the first and second control image regions.

7. The method of claim 1, wherein determining the wavelength property of the light output by the light source comprises calculating a fractional change in the wavelength of the output light from fractional changes in relative sizes of the first and second control image regions.

8. The method of claim 1, wherein determining the wavelength property of the light output by the light source comprises calculating a fractional change in the wavelength of the output light from fractional changes in relative positions of the first and second control image regions, wherein the change in relative position of the first control image is opposite in direction from the change in relative position of the second control image region.

9. The method of claim 1, wherein determining the wavelength property of the light output by the light source comprises calculating a fractional change in the wavelength of the output light from a fractional change in the position and/or size of the first control image region.

10. The method of claim 1, wherein the diffractive pattern further comprises a grating function.

11. The method of claim 10, wherein the primary image region results from a zero diffraction order of the grating function, and the first and second control image regions result from non-zero diffraction orders of the grating function.

12. The method of claim 10, the method further comprising:

changing the grating function to adjust the position of the first control image region;

determining, based on the received first signal, if the position of the first control image region at least partially overlaps with a position of a first detector region of the detector arrangement;

determining the grating function that gives rise to the least partial overlap of the first control image region and the first detector region;

calculating an angle of diffraction corresponding to said determined grating function based on a position of the first detector region; and calculating the wavelength of the light output by the light source based on a diffraction spacing of the grating function and the determined angle of diffraction.

13. The method of claim 1, wherein the positions of the detector arrangement and the spatial light modulator are fixed relative to one another.

14. A holographic projection system arranged to detect detecting a wavelength property of the light output from a light source, the holographic projection system comprising:

the light source;

a spatial light modulator arranged to receive the light from the light source and output spatially modulated light in accordance with a diffractive pattern comprising a computer-generated hologram to form an image at a display plane, the image comprising a primary image region comprising information for a user, a first control image region, and a second control image region, wherein positions and sizes of the first and second control image regions are dependent on the diffractive pattern and the wavelength;

a detector arrangement configured to detect light travelling to or from the first control image region and output a first signal representative of a position and/or a size of the first control image region and to detect light travelling to or from the second control image region and output a second signal representative of a position and/or a size of the second control image region; and a processor arranged to cause the system to perform the method as claimed in claim 1.

15. A method of adjusting an optical projection system, the method comprising:

displaying a diffractive pattern comprising a computer-generated hologram on a spatial light modulator;

receiving, at the spatial light modulator, light having a wavelength from the light source at a spatial light modulator;

spatially modulating the received light in accordance with the displayed diffractive pattern comprising the computer-generated hologram to form an image at a display plane, the image comprising a primary image region comprising information for a user, a first control image region, and a second control image region spaced apart from the first control image region, wherein positions of the first and second control image regions are dependent on the diffractive pattern and the wavelength;

detecting light travelling to or from the first control image region and, separately, detecting light travelling to or from the second control image region;

receiving a first signal representative of a position and/or a size of the first control image region based on the detection of light travelling to or from the first control image region, and receiving a second signal representative of a position and/or a size of the second control image region based on the detection of light travelling to or from the second first control image region; and based on characteristics of the first signal and of the second signal that are wavelength-dependent, adjusting one or more of the wavelength of the light output by the light source and the computer-generated hologram to compensate for a shift in the wavelength of the light output by the light source.

16. The method of claim 15, wherein the first signal is representative of the size of the first control image and the second signal is representative of the size of the second control image.

17. The method of claim 15, wherein the first signal is representative of a first radial distance of the first control image from the spatial light modulator, and the second signal is representative of a second radial distance of the second control image from the second spatial light modulator, wherein the first radial distance is opposite in direction from the second radial distance.

18. The method of claim 15, wherein adjusting one or more of the wavelength of the light output by the light source and the computer-generated hologram comprises adjusting the wavelength of the light output by the light source.

19. The method of claim 15, wherein adjusting one or more of the wavelength of the light output by the light source and the computer-generated hologram comprises adjusting the computer-generated hologram.

20. The method of claim 15, wherein the diffractive pattern further comprises a grating function.

21. The method of claim 20, wherein the primary image region results from a zero diffraction order of the grating function, and the first and second control image regions result from non-zero diffraction orders of the grating function.

22. The method of claim 20, wherein the grating function is provided by a real diffraction grating.

23. The method of claim 20, wherein the grating function is displayed on the spatial light modulator.

24. The method of claim 15, wherein the positions of the detector arrangement and the spatial light modulator are fixed relative to one another.

25. A holographic projection system arranged to detect detecting a wavelength property of the light output from a light source, the holographic projection system comprising:

the light source;

a spatial light modulator arranged to receive the light from the light source and output spatially modulated light in accordance with a diffractive pattern comprising a computer-generated hologram to form an image at a display plane, the image comprising
a primary image region comprising information for a user,
a first control image region, and
a second control image region,
wherein positions and sizes of the first and second control image regions are dependent on the diffractive pattern and the wavelength;

a detector arrangement configured to detect light travelling to or from the first control image region and output a first signal representative of a position and/or a size of the first control image region and to detect light travelling to or from the second control image region and output a second signal representative of a position and/or a size of the second control image region; and a processor arranged to cause the system to perform the method as claimed in claim 15.

* * * * *